(12) United States Patent
Lin et al.

(10) Patent No.: US 12,032,136 B2
(45) Date of Patent: Jul. 9, 2024

(54) OPTICAL IMAGING LENS

(71) Applicant: GENIUS ELECTRONIC OPTICAL (XIAMEN) CO., LTD., Fujian (CN)

(72) Inventors: Maozong Lin, Fujian (CN); Jiayuan Zhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 698 days.

(21) Appl. No.: 17/189,276

(22) Filed: Mar. 2, 2021

(65) Prior Publication Data

US 2022/0196979 A1    Jun. 23, 2022

(30) Foreign Application Priority Data

Dec. 18, 2020    (CN) .......................... 202011509246.3

(51) Int. Cl.
*G02B 13/00* (2006.01)
*G02B 9/64* (2006.01)
*G02B 13/18* (2006.01)
*G02B 27/00* (2006.01)

(52) U.S. Cl.
CPC ........... *G02B 13/0045* (2013.01); *G02B 9/64* (2013.01); *G02B 13/18* (2013.01); *G02B 27/0025* (2013.01)

(58) Field of Classification Search
CPC ...... G02B 13/0045; G02B 9/64; G02B 13/18; G02B 27/0025
USPC ........................................................ 359/708
See application file for complete search history.

(56) References Cited

U.S. PATENT DOCUMENTS

2020/0209593 A1    7/2020    Hirano
2020/0209594 A1*   7/2020    Hirano ............... G02B 13/0045

FOREIGN PATENT DOCUMENTS

JP           2020109436         7/2020

OTHER PUBLICATIONS

"Office Action of Taiwan Counterpart Application", issued on Jul. 14, 2021, p. 1-p. 9.

* cited by examiner

*Primary Examiner* — Joseph P Martinez
*Assistant Examiner* — Grant A Gagnon
(74) *Attorney, Agent, or Firm* — JCIPRNET

(57) ABSTRACT

An optical imaging lens includes first to ninth lens elements sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The second lens element has negative refracting power. The fifth lens element has negative refracting power and a periphery region of the object-side surface of the fifth lens element is concave. An optical axis region of the object-side surface of the sixth lens element is concave. The seventh lens element has negative refracting power. Lens elements of the optical imaging lens are only the nine lens elements described above to meet a condition ImgH/Fno≥2.700 mm.

20 Claims, 34 Drawing Sheets

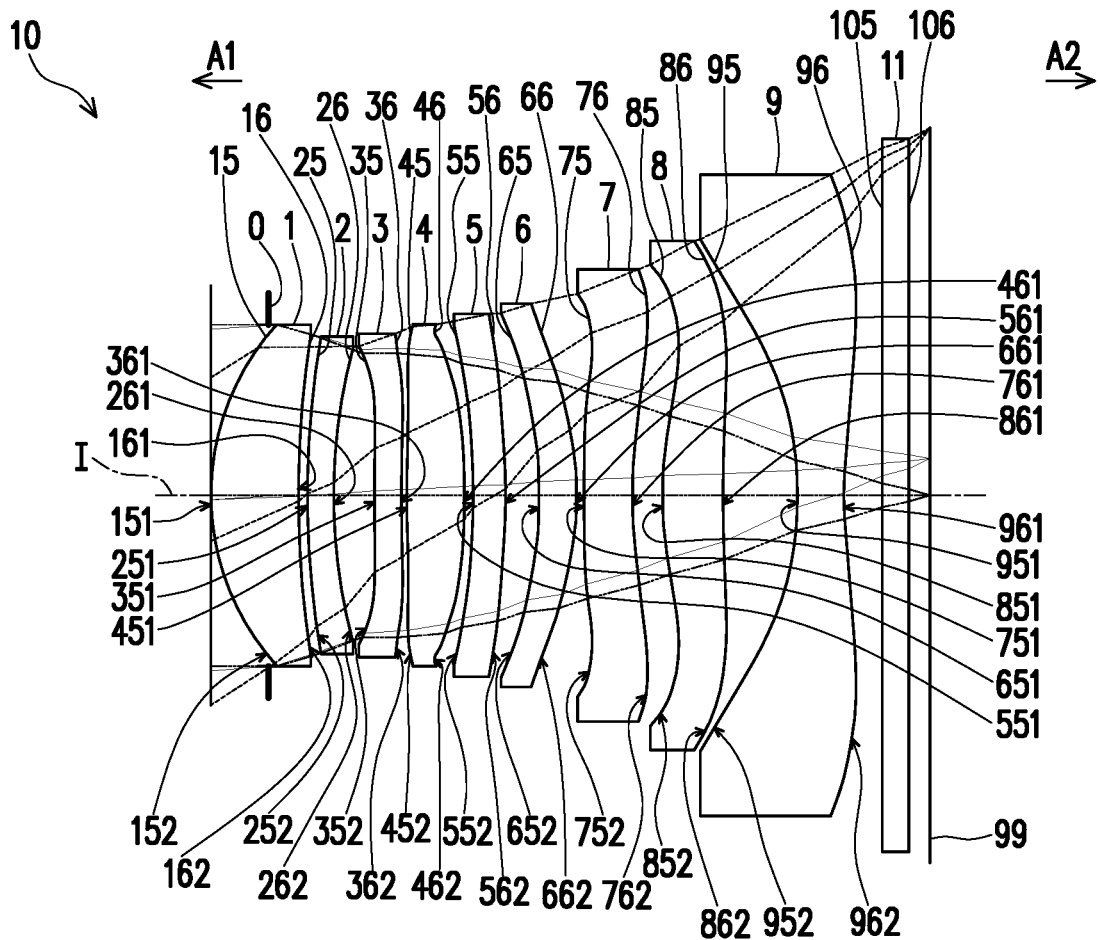
FIG. 6
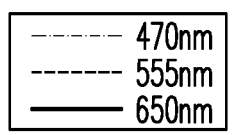
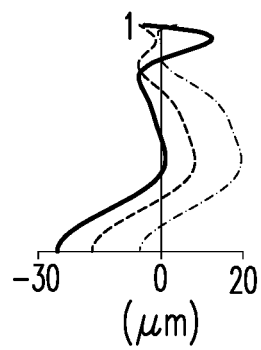
FIG. 7A
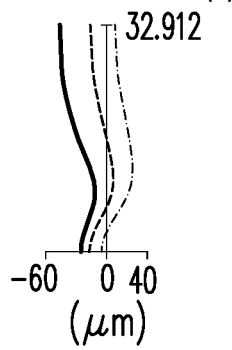
FIG. 7B
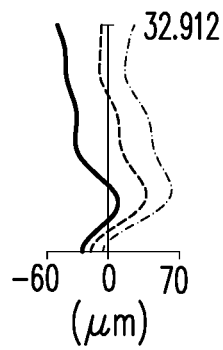
FIG. 7C
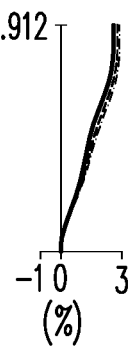
FIG. 7D

| First embodiment |||||||
|---|---|---|---|---|---|---|
| Effective focal length = 6.466 mm. Half angle of view = 32.912°. System length = 8.394 mm. f-number = 1.600. Image height = 4.320 mm |||||||
| Element | Surface | Radius of curvature (mm) | Distance (mm) | Refractive index | Abbe number | Focal length (mm) |
| Object | | | Infinity | | | |
| Aperture stop 0 | | Infinity | -0.679 | | | |
| First lens element 1 | Object-side surface 15 | 3.088 | 1.028 | 1.545 | 55.987 | 8.268 |
| | Image-side surface 16 | 8.611 | 0.108 | | | |
| Second lens element 2 | Object-side surface 25 | 7.332 | 0.303 | 1.671 | 19.243 | -43.547 |
| | Image-side surface 26 | 5.774 | 0.472 | | | |
| Third lens element 3 | Object-side surface 35 | 20.025 | 0.309 | 1.671 | 19.243 | -36.902 |
| | Image-side surface 36 | 11.050 | 0.067 | | | |
| Fourth lens element 4 | Object-side surface 45 | 12.035 | 0.672 | 1.545 | 55.987 | 10.467 |
| | Image-side surface 46 | -10.678 | 0.106 | | | |
| Fifth lens element 5 | Object-side surface 55 | -9.474 | 0.374 | 1.545 | 55.987 | -95.638 |
| | Image-side surface 56 | -11.733 | 0.394 | | | |
| Sixth lens element 6 | Object-side surface 65 | -6.009 | 0.436 | 1.545 | 55.987 | 13.496 |
| | Image-side surface 66 | -3.396 | 0.083 | | | |
| Seventh lens element 7 | Object-side surface 75 | 45.747 | 0.571 | 1.661 | 20.373 | -11.150 |
| | Image-side surface 76 | 6.366 | 0.352 | | | |
| Eighth lens element 8 | Object-side surface 85 | 4.171 | 0.703 | 1.545 | 55.987 | 9.272 |
| | Image-side surface 86 | 22.240 | 0.870 | | | |
| Ninth lens element 9 | Object-side surface 95 | -4.544 | 0.545 | 1.545 | 55.987 | -4.887 |
| | Image-side surface 96 | 6.744 | 0.445 | | | |
| Filter 11 | Object-side surface 105 | Infinity | 0.308 | | | |
| | Image-side surface 106 | Infinity | 0.247 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 1.711959E-01 | 4.611591E-04 | -1.325430E-03 | 1.390185E-03 | -7.831539E-04 |
| 16 | 0.000000E+00 | -1.971283E-02 | 8.157862E-03 | -9.186845E-04 | -8.705528E-04 |
| 25 | 1.175780E+01 | -3.426595E-02 | 1.204397E-02 | -1.239313E-03 | -1.386022E-03 |
| 26 | -3.992430E+00 | -1.274221E-02 | 6.162806E-03 | 9.242303E-04 | -2.293884E-03 |
| 35 | 0.000000E+00 | -2.238886E-02 | 8.189988E-03 | -9.169141E-03 | 4.960484E-03 |
| 36 | -5.022239E+01 | -3.235183E-02 | 1.938103E-02 | -1.549573E-02 | 7.770854E-03 |
| 45 | 1.716824E+01 | -3.456662E-02 | 2.029903E-02 | -1.605460E-02 | 8.808653E-03 |
| 46 | -3.763267E+01 | -1.338042E-02 | -4.989048E-03 | 3.267025E-03 | -1.598288E-03 |
| 55 | 0.000000E+00 | 6.343205E-03 | -6.475098E-03 | 2.457078E-03 | -4.590977E-04 |
| 56 | 0.000000E+00 | 4.200654E-03 | -2.050109E-03 | 3.054724E-04 | -4.459935E-06 |
| 65 | -7.801244E-01 | -2.362742E-02 | 3.292756E-02 | -2.679586E-02 | 1.339283E-02 |
| 66 | -7.770223E-01 | 3.794561E-02 | -1.244342E-02 | -2.739930E-03 | 3.818146E-03 |
| 75 | 0.000000E+00 | 4.757329E-02 | -3.205552E-02 | 1.228306E-02 | -3.426384E-03 |
| 76 | 0.000000E+00 | -1.059976E-02 | 1.885114E-03 | -7.686179E-04 | 1.220525E-04 |
| 85 | -2.449202E+01 | 1.216081E-02 | -1.238753E-02 | 4.253545E-03 | -9.843726E-04 |
| 86 | 5.143504E+00 | 2.301666E-03 | -3.742997E-03 | 8.727586E-04 | -1.334030E-04 |
| 95 | -3.844848E-01 | -1.183466E-02 | 2.364500E-03 | -2.188364E-04 | 1.654495E-05 |
| 96 | -2.434442E-01 | -1.714214E-02 | 2.327423E-03 | -2.401616E-04 | 1.480614E-05 |
| Surface | $a_{12}$ | $a_{14}$ | $a_{16}$ | $a_{18}$ | $a_{20}$ |
| 15 | 2.540673E-04 | -4.318848E-05 | 2.982400E-06 | 0.000000E+00 | 0.000000E+00 |
| 16 | 5.138296E-04 | -1.212276E-04 | 1.133319E-05 | 0.000000E+00 | 0.000000E+00 |
| 25 | 7.183778E-04 | -1.541911E-04 | 1.347991E-05 | 0.000000E+00 | 0.000000E+00 |
| 26 | 1.039934E-03 | -2.227234E-04 | 1.949843E-05 | 0.000000E+00 | 0.000000E+00 |
| 35 | -1.860366E-03 | 3.968720E-04 | -3.514596E-05 | 0.000000E+00 | 0.000000E+00 |
| 36 | -2.249304E-03 | 3.571294E-04 | -2.421296E-05 | 0.000000E+00 | 0.000000E+00 |
| 45 | -2.610980E-03 | 3.946320E-04 | -2.356048E-05 | 0.000000E+00 | 0.000000E+00 |
| 46 | 6.191119E-04 | -1.344731E-04 | 1.253086E-05 | 0.000000E+00 | 0.000000E+00 |
| 55 | 4.547910E-05 | -2.295738E-06 | 4.656249E-08 | 0.000000E+00 | 0.000000E+00 |
| 56 | -2.827687E-06 | 2.435476E-07 | -6.002913E-09 | 0.000000E+00 | 0.000000E+00 |
| 65 | -4.314523E-03 | 8.951041E-04 | -1.146408E-04 | 8.208521E-06 | -2.505626E-07 |
| 66 | -1.467415E-03 | 3.005759E-04 | -3.475209E-05 | 2.127486E-06 | -5.359337E-08 |
| 75 | 6.651456E-04 | -8.659448E-05 | 6.942939E-06 | -2.986868E-07 | 5.073583E-09 |
| 76 | -3.509755E-06 | -1.757475E-06 | 2.768387E-07 | -1.689401E-08 | 3.844110E-10 |
| 85 | 1.455884E-04 | -1.368025E-05 | 7.999912E-07 | -2.653360E-08 | 3.785290E-10 |
| 86 | 1.199063E-05 | -5.694985E-07 | 1.160768E-08 | 1.578500E-11 | -2.836000E-12 |
| 95 | -9.805524E-07 | 4.120191E-08 | -1.136756E-09 | 1.856500E-11 | -1.360000E-13 |
| 96 | -5.381605E-07 | 1.234353E-08 | -2.456640E-10 | 4.983000E-12 | -5.300000E-14 |

FIG. 9

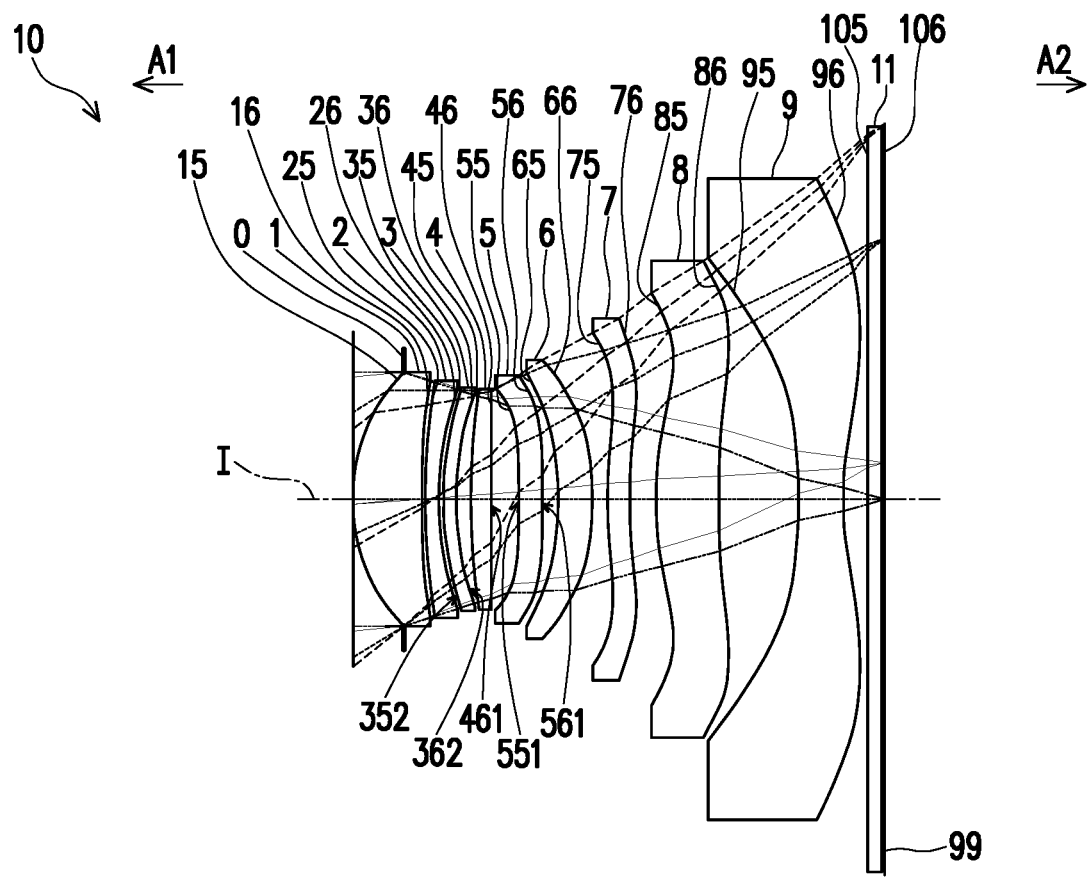
FIG. 10
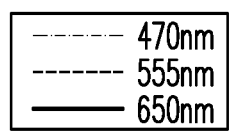
| Longitudinal spherical aberration Field of view | Field curvature (sagittal direction) Half field of view (°) | Field curvature (tangential direction) Half field of view (°) | Distortion Half field of view (°) |
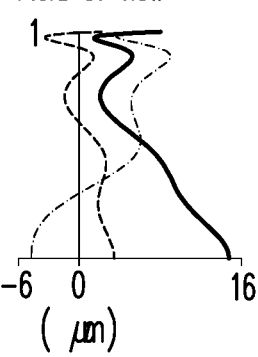
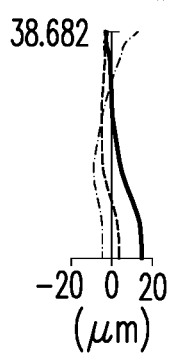
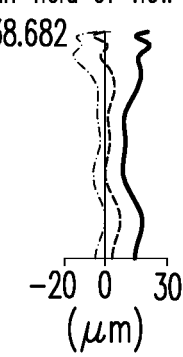
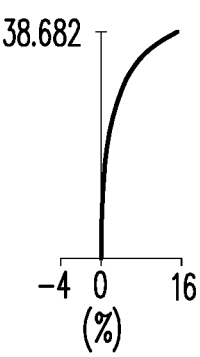
FIG. 11A   FIG. 11B   FIG. 11C   FIG. 11D

| Second embodiment |||||||
| --- | --- | --- | --- | --- | --- | --- |
| Effective focal length = 6.302 mm. Half angle of view = 38.682°. System length = 8.188 mm. f-number = 1.600. Image height = 5.800 mm |||||||
| Element | Surface | Radius of curvature (mm) | Distance (mm) | Refractive index | Abbe number | Focal length (mm) |
| Object | | | Infinity | | | |
| Aperture stop 0 | | Infinity | -0.787 | | | |
| First lens element 1 | Object-side surface 15 | 2.918 | 1.063 | 1.545 | 55.987 | 6.419 |
| | Image-side surface 16 | 15.160 | 0.050 | | | |
| Second lens element 2 | Object-side surface 25 | 9.166 | 0.204 | 1.671 | 19.243 | -15.548 |
| | Image-side surface 26 | 4.857 | 0.075 | | | |
| Third lens element 3 | Object-side surface 35 | 4.843 | 0.202 | 1.671 | 19.243 | -156.530 |
| | Image-side surface 36 | 4.554 | 0.222 | | | |
| Fourth lens element 4 | Object-side surface 45 | 12.358 | 0.310 | 1.545 | 55.987 | 28.215 |
| | Image-side surface 46 | 61.798 | 0.426 | | | |
| Fifth lens element 5 | Object-side surface 55 | 412.632 | 0.360 | 1.671 | 19.243 | -1489.716 |
| | Image-side surface 56 | 292.791 | 0.254 | | | |
| Sixth lens element 6 | Object-side surface 65 | -5.075 | 0.520 | 1.545 | 55.987 | 95.008 |
| | Image-side surface 66 | -4.791 | 0.234 | | | |
| Seventh lens element 7 | Object-side surface 75 | 6.470 | 0.348 | 1.545 | 55.987 | -57.319 |
| | Image-side surface 76 | 5.260 | 0.393 | | | |
| Eighth lens element 8 | Object-side surface 85 | 4.163 | 0.972 | 1.545 | 55.987 | 8.490 |
| | Image-side surface 86 | 37.267 | 1.227 | | | |
| Ninth lens element 9 | Object-side surface 95 | -10.232 | 0.687 | 1.661 | 20.373 | -4.840 |
| | Image-side surface 96 | 4.845 | 0.382 | | | |
| Filter 11 | Object-side surface 105 | Infinity | 0.210 | 1.517 | 64.167 | |
| | Image-side surface 106 | Infinity | 0.050 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 0.000000E+00 | 8.820054E-04 | 1.658587E-04 | 2.044067E-04 | -1.264736E-04 |
| 16 | 0.000000E+00 | -1.243579E-02 | 1.289448E-02 | -7.772613E-03 | 3.376206E-03 |
| 25 | 0.000000E+00 | -9.439550E-03 | 5.824307E-03 | -5.520883E-03 | 3.358759E-03 |
| 26 | 1.944227E+00 | 1.280879E-02 | -1.571778E-02 | 5.517954E-03 | -1.288912E-03 |
| 35 | 1.561268E+00 | -8.915662E-05 | -1.300613E-02 | 9.500785E-03 | -4.311075E-03 |
| 36 | 1.749919E+00 | -1.325198E-02 | -5.135913E-03 | 6.406709E-03 | -2.364557E-03 |
| 45 | 0.000000E+00 | 4.008069E-04 | -5.188791E-03 | 1.439001E-03 | 1.183482E-03 |
| 46 | 0.000000E+00 | -1.493692E-03 | -2.296617E-03 | -7.564573E-04 | 2.144544E-03 |
| 55 | 0.000000E+00 | -2.246055E-02 | -9.279367E-03 | 4.779584E-03 | -3.724966E-03 |
| 56 | 0.000000E+00 | -1.381077E-02 | -1.174924E-02 | 4.734453E-03 | -1.373801E-03 |
| 65 | 0.000000E+00 | 1.125526E-02 | -2.616574E-02 | 1.867734E-02 | -1.269595E-02 |
| 66 | 0.000000E+00 | 1.088105E-02 | -3.152518E-02 | 1.791496E-02 | -6.893567E-03 |
| 75 | 0.000000E+00 | -1.138578E-02 | -4.959732E-03 | 1.126613E-03 | 6.295745E-05 |
| 76 | 0.000000E+00 | -4.110372E-02 | 1.578482E-02 | -7.473523E-03 | 2.474228E-03 |
| 85 | 0.000000E+00 | -1.536790E-02 | -1.146796E-03 | 8.534578E-04 | -3.202905E-04 |
| 86 | 0.000000E+00 | 2.111276E-02 | -7.531639E-03 | 1.416723E-03 | -1.920312E-04 |
| 95 | 0.000000E+00 | -7.286735E-03 | -1.761515E-03 | 9.836177E-04 | -2.194479E-04 |
| 96 | -7.908792E+00 | -9.034129E-03 | 4.755686E-04 | 5.043942E-05 | -1.056947E-05 |
| Surface | $a_{12}$ | $a_{14}$ | $a_{16}$ | $a_{18}$ | $a_{20}$ |
| 15 | 5.747369E-05 | -1.279269E-05 | 1.307973E-06 | 0.000000E+00 | 0.000000E+00 |
| 16 | -9.147618E-04 | 1.391100E-04 | -8.922788E-06 | 0.000000E+00 | 0.000000E+00 |
| 25 | -1.080431E-03 | 1.788094E-04 | -1.224010E-05 | 0.000000E+00 | 0.000000E+00 |
| 26 | 3.301506E-05 | 8.911224E-05 | -1.534292E-05 | 0.000000E+00 | 0.000000E+00 |
| 35 | 1.005785E-03 | -6.749720E-05 | -3.772470E-06 | 0.000000E+00 | 0.000000E+00 |
| 36 | 3.875013E-04 | -9.020770E-06 | -2.167104E-06 | 0.000000E+00 | 0.000000E+00 |
| 45 | -1.008694E-03 | 3.445009E-04 | -4.156620E-05 | 0.000000E+00 | 0.000000E+00 |
| 46 | -1.430364E-03 | 4.612915E-04 | -5.351378E-05 | 0.000000E+00 | 0.000000E+00 |
| 55 | 2.102235E-03 | -9.967217E-04 | 3.074473E-04 | -4.868542E-05 | 3.109342E-06 |
| 56 | 1.027241E-04 | 1.818161E-04 | -1.015124E-04 | 2.134988E-05 | -1.487564E-06 |
| 65 | 7.411326E-03 | -2.678068E-03 | 5.332276E-04 | -5.320701E-05 | 2.051811E-06 |
| 66 | 2.098521E-03 | -4.405380E-04 | 5.295843E-05 | -3.039814E-06 | 6.363963E-08 |
| 75 | -4.400753E-05 | -7.133189E-07 | 1.539270E-06 | -1.815750E-07 | 6.710290E-09 |
| 76 | -5.210357E-04 | 6.793977E-05 | -5.313175E-06 | 2.317839E-07 | -4.457416E-09 |
| 85 | 7.556661E-05 | -1.107886E-05 | 9.450902E-07 | -4.206400E-08 | 7.457270E-10 |
| 86 | 1.899490E-05 | -1.335913E-06 | 6.102732E-08 | -1.535333E-09 | 1.515800E-11 |
| 95 | 2.819151E-05 | -2.152529E-06 | 9.367043E-08 | -2.038175E-09 | 1.499200E-11 |
| 96 | 6.286981E-07 | -7.964192E-09 | -6.271860E-10 | 2.595500E-11 | -2.960000E-13 |

FIG. 13

| Third embodiment | | | | | | |
|---|---|---|---|---|---|---|
| Effective focal length = 6.783 mm. Half angle of view = 41.490°. System length = 8.843 mm. f-number = 1.600. Image height = 6.700 mm | | | | | | |
| Element | Surface | Radius of curvature (mm) | Distance (mm) | Refractive index | Abbe number | Focal length (mm) |
| Object | | | Infinity | | | |
| Aperture stop 0 | | Infinity | -0.837 | | | |
| First lens element 1 | Object-side surface 15 | 3.161 | 0.910 | 1.545 | 55.987 | 7.264 |
| | Image-side surface 16 | 13.961 | 0.092 | | | |
| Second lens element 2 | Object-side surface 25 | 6.752 | 0.272 | 1.671 | 19.243 | -37.520 |
| | Image-side surface 26 | 5.248 | 0.107 | | | |
| Third lens element 3 | Object-side surface 35 | 5.795 | 0.200 | 1.671 | 19.243 | -32.057 |
| | Image-side surface 36 | 4.511 | 0.226 | | | |
| Fourth lens element 4 | Object-side surface 45 | 10.800 | 0.346 | 1.545 | 55.987 | 27.518 |
| | Image-side surface 46 | 37.919 | 0.636 | | | |
| Fifth lens element 5 | Object-side surface 55 | -22.065 | 0.368 | 1.671 | 19.243 | -61.253 |
| | Image-side surface 56 | -47.430 | 0.170 | | | |
| Sixth lens element 6 | Object-side surface 65 | -10.894 | 0.499 | 1.545 | 55.987 | 2427.681 |
| | Image-side surface 66 | -10.980 | 0.299 | | | |
| Seventh lens element 7 | Object-side surface 75 | 10.175 | 0.237 | 1.661 | 20.373 | -31.429 |
| | Image-side surface 76 | 6.787 | 0.247 | | | |
| Eighth lens element 8 | Object-side surface 85 | 6.911 | 1.491 | 1.545 | 55.987 | 5.159 |
| | Image-side surface 86 | -4.397 | 1.128 | | | |
| Ninth lens element 9 | Object-side surface 95 | -5.608 | 0.648 | 1.545 | 55.987 | -4.094 |
| | Image-side surface 96 | 3.872 | 0.400 | | | |
| Filter 11 | Object-side surface 105 | Infinity | 0.210 | 1.517 | 64.167 | |
| | Image-side surface 106 | Infinity | 0.356 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | 0.000000E+00 | 9.715314E-04 | 1.453591E-04 | 7.362635E-05 | -5.107509E-05 |
| 16 | 0.000000E+00 | -8.454308E-03 | 6.997632E-03 | -2.420629E-03 | 4.744473E-04 |
| 25 | 0.000000E+00 | -1.505490E-02 | 7.194071E-03 | -1.403149E-03 | -1.541185E-04 |
| 26 | 2.171715E+00 | -5.594087E-03 | -3.171210E-03 | 1.077014E-03 | 1.288134E-04 |
| 35 | 1.871930E+00 | -1.433755E-03 | -5.368260E-03 | -1.515242E-03 | 2.635208E-03 |
| 36 | 1.920953E+00 | -6.411211E-03 | -8.378402E-04 | -2.126309E-03 | 2.146273E-03 |
| 45 | 0.000000E+00 | -1.176958E-03 | 2.107351E-03 | -1.854505E-03 | 1.128949E-03 |
| 46 | 0.000000E+00 | -1.595725E-03 | -1.396794E-04 | 7.043780E-04 | -6.508490E-04 |
| 55 | 0.000000E+00 | -1.582524E-02 | -1.729332E-02 | 1.721528E-02 | -1.634728E-02 |
| 56 | 0.000000E+00 | 2.570063E-03 | -3.007702E-02 | 2.184294E-02 | -1.178497E-02 |
| 65 | 0.000000E+00 | 1.881186E-02 | -3.463105E-02 | 2.190889E-02 | -7.838074E-03 |
| 66 | 0.000000E+00 | 1.067218E-02 | -3.452840E-02 | 2.119226E-02 | -8.056470E-03 |
| 75 | 0.000000E+00 | 1.261683E-02 | -3.087808E-02 | 1.475877E-02 | -3.940000E-03 |
| 76 | 0.000000E+00 | -2.587512E-03 | -2.065956E-02 | 1.020578E-02 | -2.600151E-03 |
| 85 | 0.000000E+00 | -5.264322E-03 | -6.093002E-03 | 2.681275E-03 | -6.605940E-04 |
| 86 | -1.569904E+01 | -5.861387E-03 | 3.036065E-03 | -1.404727E-03 | 3.425475E-04 |
| 95 | 0.000000E+00 | -9.567457E-03 | -9.730004E-04 | 4.433876E-04 | -5.321321E-05 |
| 96 | -8.650237E+00 | -9.294191E-03 | 8.373378E-04 | -3.492709E-05 | -1.169526E-06 |
| Surface | $a_{12}$ | $a_{14}$ | $a_{16}$ | $a_{18}$ | $a_{20}$ |
| 15 | 2.647331E-05 | -6.008622E-06 | 5.429226E-07 | 0.000000E+00 | 0.000000E+00 |
| 16 | -3.836814E-05 | -1.411004E-06 | 3.282227E-07 | 0.000000E+00 | 0.000000E+00 |
| 25 | 1.513844E-04 | -2.675795E-05 | 1.182212E-06 | 0.000000E+00 | 0.000000E+00 |
| 26 | -1.862782E-04 | 7.606474E-05 | -1.053244E-05 | 0.000000E+00 | 0.000000E+00 |
| 35 | -1.014337E-03 | 1.880756E-04 | -1.438200E-05 | 0.000000E+00 | 0.000000E+00 |
| 36 | -7.518570E-04 | 1.140815E-04 | -5.478505E-06 | 0.000000E+00 | 0.000000E+00 |
| 45 | -3.783848E-04 | 7.796444E-05 | -5.641829E-06 | 0.000000E+00 | 0.000000E+00 |
| 46 | 3.171866E-04 | -6.624485E-05 | 6.372956E-06 | 0.000000E+00 | 0.000000E+00 |
| 55 | 1.067084E-02 | -4.733978E-03 | 1.341022E-03 | -2.154967E-04 | 1.481541E-05 |
| 56 | 4.574343E-03 | -1.270052E-03 | 2.441408E-04 | -2.878608E-05 | 1.543344E-06 |
| 65 | 1.793893E-03 | -2.667051E-04 | 2.484068E-05 | -1.273669E-06 | 2.401649E-08 |
| 66 | 2.255659E-03 | -4.600729E-04 | 6.202751E-05 | -4.746106E-06 | 1.522843E-07 |
| 75 | 6.576653E-04 | -7.048329E-05 | 4.768540E-06 | -1.872283E-07 | 3.270162E-09 |
| 76 | 3.958858E-04 | -3.682009E-05 | 2.034416E-06 | -6.108804E-08 | 7.809790E-10 |
| 85 | 1.094068E-04 | -1.328688E-05 | 1.131741E-06 | -5.875552E-08 | 1.373410E-09 |
| 86 | -4.853480E-05 | 4.106807E-06 | -2.041782E-07 | 5.533518E-09 | -6.382000E-11 |
| 95 | 3.727341E-06 | -1.708894E-07 | 5.047164E-09 | -8.671300E-11 | 6.550000E-13 |
| 96 | 2.263381E-07 | -1.253365E-08 | 3.568390E-10 | -5.233000E-12 | 3.100000E-14 |

FIG. 17

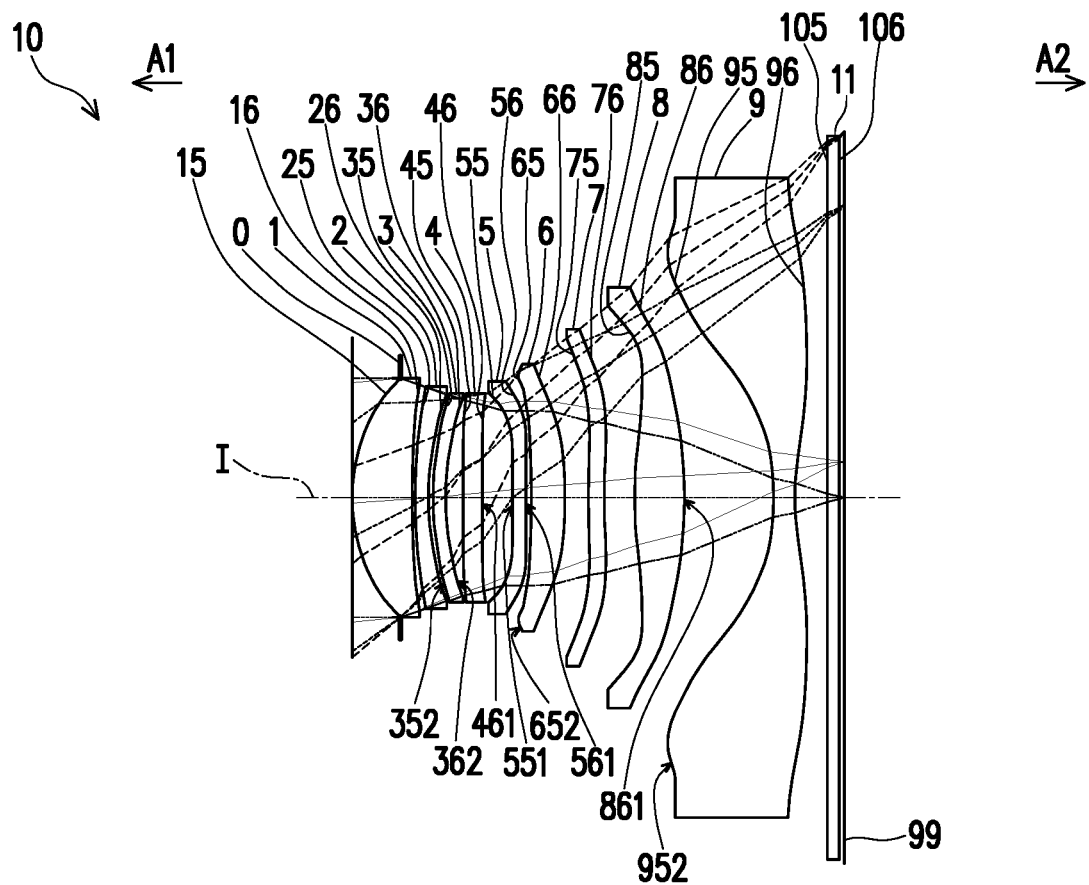
FIG. 18
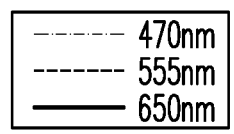
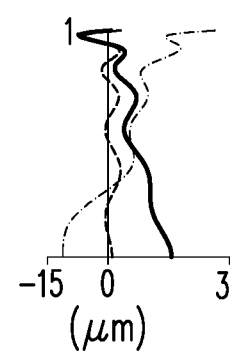
FIG. 19A
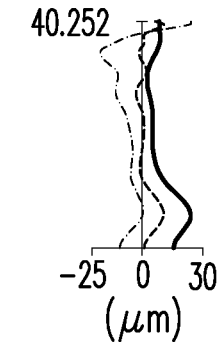
FIG. 19B
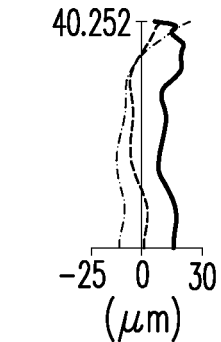
FIG. 19C
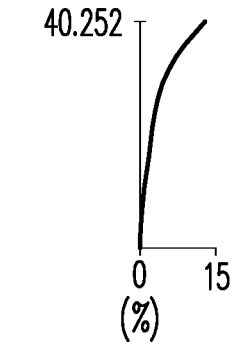
FIG. 19D

| Fourth embodiment ||||||||
|---|---|---|---|---|---|---|
| Effective focal length = 7.001 mm.Half angle of view = 40.252°.System length = 8.945 mm.f-number = 1.600.Image height = 6.700 mm ||||||||
| Element | Surface | Radius of curvature (mm) | Distance (mm) | Refractive index | Abbe number | Focal length (mm) |
| Object | | | Infinity | | | |
| Aperture stop 0 | | Infinity | -0.877 | | | |
| First lens element 1 | Object-side surface 15 | 3.279 | 1.102 | 1.545 | 55.987 | 6.930 |
| | Image-side surface 16 | 21.590 | 0.050 | | | |
| Second lens element 2 | Object-side surface 25 | 8.943 | 0.238 | 1.671 | 19.243 | -19.402 |
| | Image-side surface 26 | 5.265 | 0.087 | | | |
| Third lens element 3 | Object-side surface 35 | 5.391 | 0.228 | 1.671 | 19.243 | -290.683 |
| | Image-side surface 36 | 5.158 | 0.317 | | | |
| Fourth lens element 4 | Object-side surface 45 | 79.785 | 0.344 | 1.545 | 55.987 | -3037.225 |
| | Image-side surface 46 | 76.009 | 0.559 | | | |
| Fifth lens element 5 | Object-side surface 55 | 31.106 | 0.237 | 1.671 | 19.243 | -60.838 |
| | Image-side surface 56 | 17.674 | 0.106 | | | |
| Sixth lens element 6 | Object-side surface 65 | -19.875 | 0.603 | 1.545 | 55.987 | 28.970 |
| | Image-side surface 66 | -8.905 | 0.428 | | | |
| Seventh lens element 7 | Object-side surface 75 | 11.902 | 0.284 | 1.661 | 20.373 | -63.130 |
| | Image-side surface 76 | 9.191 | 0.558 | | | |
| Eighth lens element 8 | Object-side surface 85 | 8.446 | 0.907 | 1.545 | 55.987 | 7.010 |
| | Image-side surface 86 | -6.739 | 1.618 | | | |
| Ninth lens element 9 | Object-side surface 95 | -5.559 | 0.398 | 1.545 | 55.987 | -4.727 |
| | Image-side surface 96 | 4.944 | 0.582 | | | |
| Filter 11 | Object-side surface 105 | Infinity | 0.210 | 1.517 | 64.167 | |
| | Image-side surface 106 | Infinity | 0.091 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 0.000000E+00 | 9.509789E-04 | -2.235687E-04 | 3.663445E-04 | -2.033434E-04 |
| 16 | 0.000000E+00 | -1.125123E-02 | 9.063089E-03 | -3.198407E-03 | 6.350556E-04 |
| 25 | 0.000000E+00 | -1.524759E-02 | 6.212042E-03 | 9.052700E-05 | -8.842923E-04 |
| 26 | 2.196473E+00 | -4.738434E-03 | -2.170554E-03 | -2.450199E-03 | 3.378112E-03 |
| 35 | 1.707541E+00 | -3.414744E-03 | 2.638675E-03 | -1.010316E-02 | 7.550455E-03 |
| 36 | 2.244390E+00 | -7.738234E-03 | 6.298957E-03 | -8.680069E-03 | 5.691282E-03 |
| 45 | 0.000000E+00 | -3.424233E-03 | 4.242056E-03 | -4.061613E-03 | 2.799297E-03 |
| 46 | 0.000000E+00 | -1.731077E-03 | 2.373845E-03 | -1.878860E-03 | 1.214536E-03 |
| 55 | 0.000000E+00 | -1.341768E-02 | -2.481654E-02 | 3.007686E-02 | -2.702763E-02 |
| 56 | 0.000000E+00 | 9.121037E-03 | -4.697632E-02 | 4.111507E-02 | -2.551558E-02 |
| 65 | 0.000000E+00 | 2.481163E-02 | -4.150530E-02 | 2.542364E-02 | -8.548405E-03 |
| 66 | 0.000000E+00 | 6.828607E-03 | -2.450145E-02 | 1.567046E-02 | -6.873755E-03 |
| 75 | 0.000000E+00 | 3.156081E-03 | -2.242030E-02 | 1.160804E-02 | -3.396320E-03 |
| 76 | 0.000000E+00 | -5.701772E-03 | -1.634423E-02 | 8.363243E-03 | -2.223714E-03 |
| 85 | 0.000000E+00 | 1.430994E-03 | -3.567773E-03 | 3.552737E-04 | 1.308854E-04 |
| 86 | -4.196046E+01 | -3.778434E-03 | 3.565232E-03 | -2.030470E-03 | 5.412222E-04 |
| 95 | 0.000000E+00 | -1.475166E-02 | 1.228944E-03 | -3.437875E-05 | 8.872243E-06 |
| 96 | -1.077693E+01 | -1.085016E-02 | 1.407305E-03 | -1.381673E-04 | 1.016492E-05 |
| Surface | $a_{12}$ | $a_{14}$ | $a_{16}$ | $a_{18}$ | $a_{20}$ |
| 15 | 6.705684E-05 | -1.136997E-05 | 8.035234E-07 | 0.000000E+00 | 0.000000E+00 |
| 16 | -6.003377E-05 | 6.026230E-07 | 2.385738E-07 | 0.000000E+00 | 0.000000E+00 |
| 25 | 3.243554E-04 | -4.893468E-05 | 2.601170E-06 | 0.000000E+00 | 0.000000E+00 |
| 26 | -1.573505E-03 | 3.533403E-04 | -3.102914E-05 | 0.000000E+00 | 0.000000E+00 |
| 35 | -2.719110E-03 | 5.117749E-04 | -3.950436E-05 | 0.000000E+00 | 0.000000E+00 |
| 36 | -2.038233E-03 | 3.962340E-04 | -3.217775E-05 | 0.000000E+00 | 0.000000E+00 |
| 45 | -1.145024E-03 | 2.662124E-04 | -2.536554E-05 | 0.000000E+00 | 0.000000E+00 |
| 46 | -4.871587E-04 | 1.195463E-04 | -1.198511E-05 | 0.000000E+00 | 0.000000E+00 |
| 55 | 1.552988E-02 | -5.859367E-03 | 1.392174E-03 | -1.849134E-04 | 1.028452E-05 |
| 56 | 1.098042E-02 | -3.262123E-03 | 6.380732E-04 | -7.263851E-05 | 3.587731E-06 |
| 65 | 1.703863E-03 | -1.919921E-04 | 9.150195E-06 | 2.524486E-07 | -3.432613E-08 |
| 66 | 2.281926E-03 | -5.168779E-04 | 7.122832E-05 | -5.244330E-06 | 1.556332E-07 |
| 75 | 6.465731E-04 | -8.307836E-05 | 7.030854E-06 | -3.527015E-07 | 7.861658E-09 |
| 76 | 3.653794E-04 | -3.901353E-05 | 2.711009E-06 | -1.136666E-07 | 2.194316E-09 |
| 85 | -4.633326E-05 | 6.475205E-06 | -4.884444E-07 | 1.978934E-08 | -3.379250E-10 |
| 86 | -8.104444E-05 | 7.161872E-06 | -3.699221E-07 | 1.032936E-08 | -1.204660E-10 |
| 95 | -1.268730E-06 | 8.045709E-08 | -2.663404E-09 | 4.548500E-11 | -3.170000E-13 |
| 96 | -5.197383E-07 | 1.739772E-08 | -3.599180E-10 | 4.166000E-12 | -2.100000E-14 |

FIG. 21

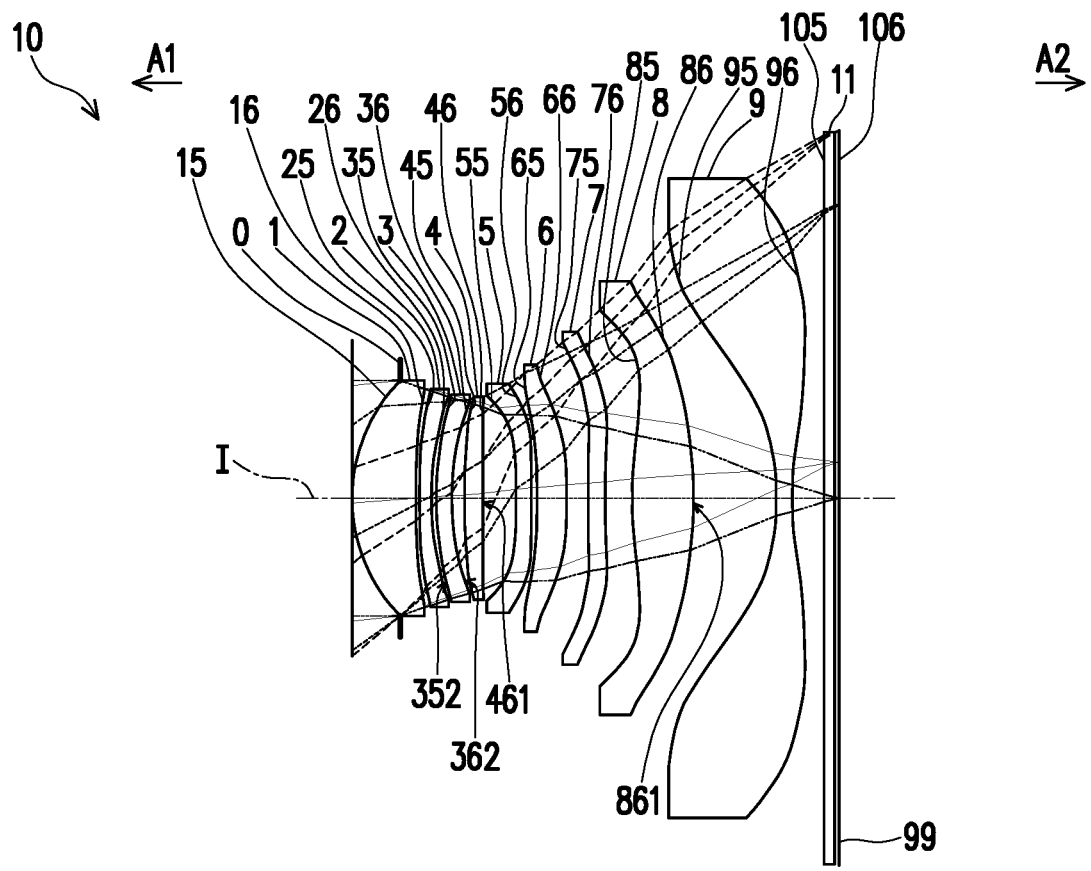
FIG. 22
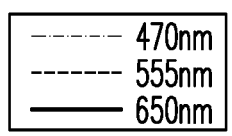
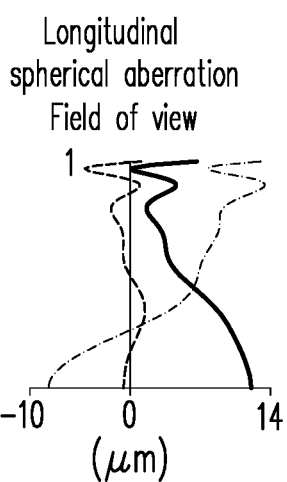
FIG. 23A
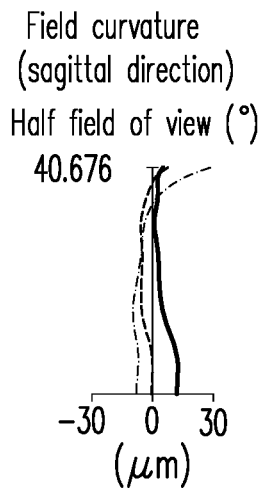
FIG. 23B
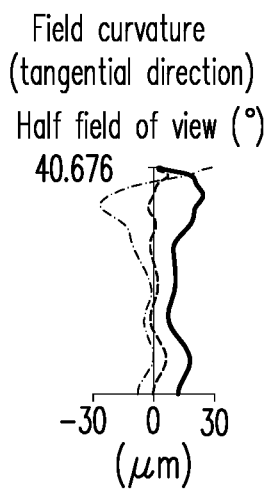
FIG. 23C
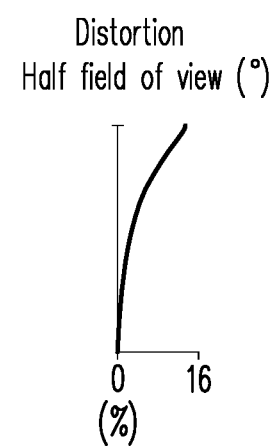
FIG. 23D

| Fifth embodiment ||||||
|---|---|---|---|---|---|---|
| | Effective focal length = 6.865 mm.Half angle of view = 40.676°.System length = 8.819 mm.f-number = 1.600.Image height = 6.700 mm |
| Element | Surface | Radius of curvature (mm) | Distance (mm) | Refractive index | Abbe number | Focal length (mm) |
| Object | | | Infinity | | | |
| Aperture stop 0 | | Infinity | -0.865 | | | |
| First lens element 1 | Object-side surface 15 | 3.202 | 1.154 | 1.545 | 55.987 | 7.093 |
| | Image-side surface 16 | 16.086 | 0.050 | | | |
| Second lens element 2 | Object-side surface 25 | 7.990 | 0.234 | 1.671 | 19.243 | -25.143 |
| | Image-side surface 26 | 5.374 | 0.080 | | | |
| Third lens element 3 | Object-side surface 35 | 5.554 | 0.282 | 1.671 | 19.243 | -51.893 |
| | Image-side surface 36 | 4.698 | 0.234 | | | |
| Fourth lens element 4 | Object-side surface 45 | 15.703 | 0.319 | 1.545 | 55.987 | 34.907 |
| | Image-side surface 46 | 88.320 | 0.614 | | | |
| Fifth lens element 5 | Object-side surface 55 | -23.572 | 0.281 | 1.661 | 20.373 | -37.805 |
| | Image-side surface 56 | -362.438 | 0.094 | | | |
| Sixth lens element 6 | Object-side surface 65 | -12.427 | 0.547 | 1.544 | 49.922 | 42.107 |
| | Image-side surface 66 | -8.195 | 0.381 | | | |
| Seventh lens element 7 | Object-side surface 75 | 14.662 | 0.312 | 1.661 | 20.373 | -46.528 |
| | Image-side surface 76 | 9.873 | 0.496 | | | |
| Eighth lens element 8 | Object-side surface 85 | 7.645 | 1.114 | 1.544 | 49.922 | 6.483 |
| | Image-side surface 86 | -6.261 | 1.499 | | | |
| Ninth lens element 9 | Object-side surface 95 | -5.725 | 0.278 | 1.545 | 55.987 | -4.583 |
| | Image-side surface 96 | 4.525 | 0.582 | | | |
| Filter 11 | Object-side surface 105 | Infinity | 0.210 | 1.517 | 64.167 | |
| | Image-side surface 106 | Infinity | 0.058 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 0.000000E+00 | 9.113152E-04 | 9.389303E-05 | 9.929356E-05 | -5.944392E-05 |
| 16 | 0.000000E+00 | -1.000011E-02 | 9.740172E-03 | -4.040142E-03 | 9.623198E-04 |
| 25 | 0.000000E+00 | -1.577476E-02 | 8.093861E-03 | -1.768365E-03 | -1.581102E-04 |
| 26 | 2.188690E+00 | -4.708668E-03 | -4.186069E-03 | 4.012878E-05 | 1.766867E-03 |
| 35 | 1.882250E+00 | -1.138695E-03 | -3.133579E-03 | -4.592766E-03 | 4.911452E-03 |
| 36 | 2.024563E+00 | -6.142729E-03 | 2.042423E-03 | -4.441827E-03 | 3.288102E-03 |
| 45 | 0.000000E+00 | -2.014991E-03 | 1.913572E-03 | -1.370847E-03 | 7.861683E-04 |
| 46 | 0.000000E+00 | -2.305375E-03 | 6.629365E-04 | -4.565701E-04 | 3.513497E-04 |
| 55 | 0.000000E+00 | -1.808421E-02 | -1.357490E-02 | 1.198655E-02 | -1.115798E-02 |
| 56 | 0.000000E+00 | 2.636555E-03 | -2.948376E-02 | 2.062613E-02 | -1.064093E-02 |
| 65 | 0.000000E+00 | 1.752824E-02 | -3.310187E-02 | 2.216757E-02 | -9.028318E-03 |
| 66 | 0.000000E+00 | 1.079799E-03 | -2.056011E-02 | 1.326933E-02 | -5.683171E-03 |
| 75 | 0.000000E+00 | -3.249488E-03 | -1.409502E-02 | 6.133869E-03 | -1.202211E-03 |
| 76 | 0.000000E+00 | -1.301105E-02 | -7.810919E-03 | 3.518993E-03 | -5.725804E-04 |
| 85 | 0.000000E+00 | -4.486527E-03 | -1.849736E-03 | 4.452142E-05 | 1.529263E-04 |
| 86 | -3.007673E+01 | -3.206633E-03 | 2.623655E-03 | -1.490604E-03 | 4.005804E-04 |
| 95 | 0.000000E+00 | -1.783486E-02 | 2.909562E-03 | -3.025378E-04 | 2.738692E-05 |
| 96 | -8.368555E+00 | -1.492135E-02 | 2.444958E-03 | -2.646761E-04 | 1.898337E-05 |
| Surface | $a_{12}$ | $a_{14}$ | $a_{16}$ | $a_{18}$ | $a_{20}$ |
| 15 | 2.457981E-05 | -4.870782E-06 | 3.999508E-07 | 0.000000E+00 | 0.000000E+00 |
| 16 | -1.094193E-04 | 1.571831E-06 | 5.286253E-07 | 0.000000E+00 | 0.000000E+00 |
| 25 | 2.081878E-04 | -4.465225E-05 | 2.905154E-06 | 0.000000E+00 | 0.000000E+00 |
| 26 | -9.709856E-04 | 2.425085E-04 | -2.378682E-05 | 0.000000E+00 | 0.000000E+00 |
| 35 | -2.013434E-03 | 4.109551E-04 | -3.349451E-05 | 0.000000E+00 | 0.000000E+00 |
| 36 | -1.195811E-03 | 2.157696E-04 | -1.478384E-05 | 0.000000E+00 | 0.000000E+00 |
| 45 | -1.528908E-04 | 1.155017E-05 | 4.641900E-07 | 0.000000E+00 | 0.000000E+00 |
| 46 | -1.000302E-04 | 3.036112E-05 | -4.284444E-06 | 0.000000E+00 | 0.000000E+00 |
| 55 | 6.945617E-03 | -2.958874E-03 | 8.254348E-04 | -1.326368E-04 | 9.132778E-06 |
| 56 | 3.750671E-03 | -8.972283E-04 | 1.499253E-04 | -1.646653E-05 | 8.895577E-07 |
| 65 | 2.539330E-03 | -4.983342E-04 | 6.555544E-05 | -5.157425E-06 | 1.801056E-07 |
| 66 | 1.969812E-03 | -5.016139E-04 | 8.139880E-05 | -7.261649E-06 | 2.677261E-07 |
| 75 | 9.063091E-05 | 4.585459E-06 | -1.231289E-06 | 7.130145E-08 | -1.215387E-09 |
| 76 | 8.814785E-06 | 9.584853E-06 | -1.327283E-06 | 7.299811E-08 | -1.481563E-09 |
| 85 | -4.399343E-05 | 5.699888E-06 | -4.070029E-07 | 1.597321E-08 | -2.724910E-10 |
| 86 | -6.071774E-05 | 5.405497E-06 | -2.795591E-07 | 7.781752E-09 | -9.031300E-11 |
| 95 | -1.804608E-06 | 7.767733E-08 | -2.059231E-09 | 3.057400E-11 | -1.950000E-13 |
| 96 | -9.083003E-07 | 2.858943E-08 | -5.711910E-10 | 6.621000E-12 | -3.400000E-14 |

FIG. 25

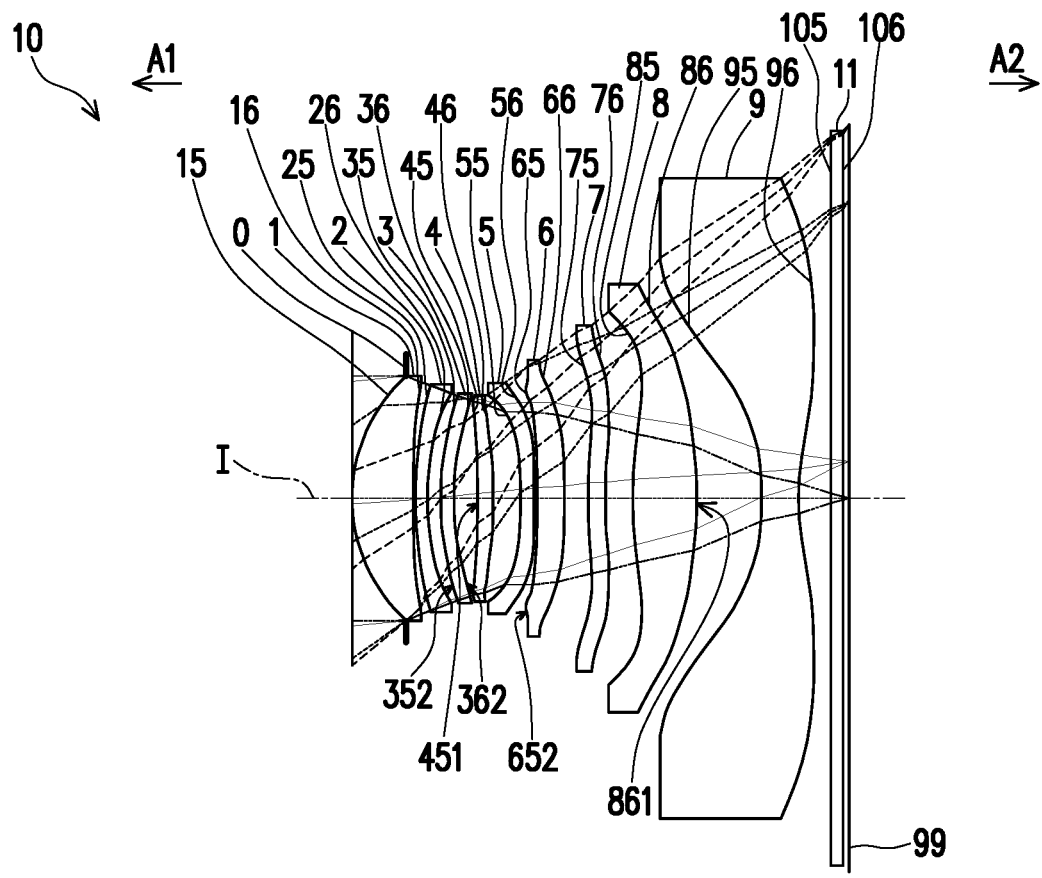
FIG. 26
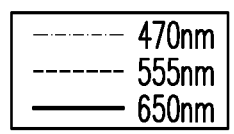
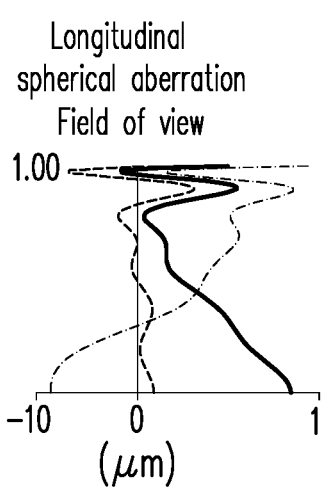
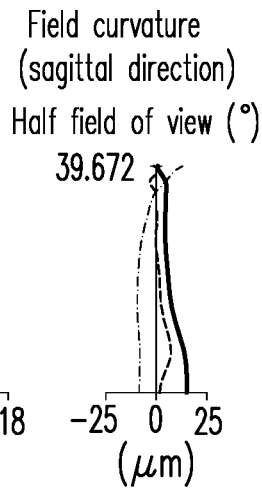
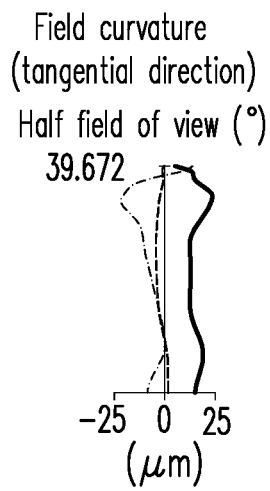
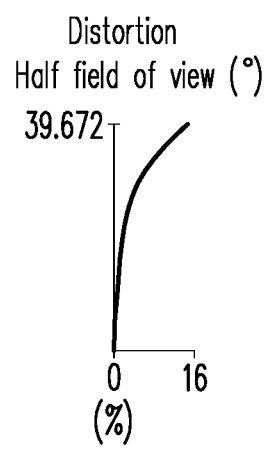
FIG. 27A  FIG. 27B  FIG. 27C  FIG. 27D

| Sixth embodiment | | | | | | |
|---|---|---|---|---|---|---|
| Effective focal length = 7.046 mm.Half angle of view = 39.672°.System length = 8.906 mm.f-number = 1.600.mage height = 6.700 mm | | | | | | |
| Element | Surface | Radius of curvature (mm) | Distance (mm) | Refractive index | Abbe number | Focal length (mm) |
| Object | | | Infinity | | | |
| Aperture stop 0 | | Infinity | -0.973 | | | |
| First lens element 1 | Object-side surface 15 | 3.099 | 1.085 | 1.545 | 55.987 | 6.717 |
| | Image-side surface 16 | 17.480 | 0.050 | | | |
| Second lens element 2 | Object-side surface 25 | 7.144 | 0.205 | 1.671 | 19.243 | -18.615 |
| | Image-side surface 26 | 4.508 | 0.242 | | | |
| Third lens element 3 | Object-side surface 35 | 5.249 | 0.240 | 1.671 | 19.243 | -223.680 |
| | Image-side surface 36 | 4.980 | 0.425 | | | |
| Fourth lens element 4 | Object-side surface 45 | -20.794 | 0.279 | 1.545 | 55.987 | 38.840 |
| | Image-side surface 46 | -10.552 | 0.480 | | | |
| Fifth lens element 5 | Object-side surface 55 | -15.443 | 0.262 | 1.671 | 19.243 | -58.669 |
| | Image-side surface 56 | -25.426 | 0.057 | | | |
| Sixth lens element 6 | Object-side surface 65 | -15.232 | 0.481 | 1.545 | 55.987 | 275.093 |
| | Image-side surface 66 | -13.984 | 0.420 | | | |
| Seventh lens element 7 | Object-side surface 75 | 8.320 | 0.302 | 1.661 | 20.373 | -65.663 |
| | Image-side surface 76 | 6.890 | 0.495 | | | |
| Eighth lens element 8 | Object-side surface 85 | 7.010 | 1.155 | 1.545 | 55.987 | 6.413 |
| | Image-side surface 86 | -6.596 | 1.162 | | | |
| Ninth lens element 9 | Object-side surface 95 | -5.595 | 0.667 | 1.545 | 55.987 | -4.435 |
| | Image-side surface 96 | 4.453 | 0.582 | | | |
| Filter 11 | Object-side surface 105 | Infinity | 0.210 | 1.517 | 64.167 | |
| | Image-side surface 106 | Infinity | 0.107 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 0.000000E+00 | 1.104205E-03 | -2.946653E-05 | 2.549086E-04 | -1.636982E-04 |
| 16 | 0.000000E+00 | -7.042629E-03 | 5.181901E-03 | -1.340218E-03 | 9.011650E-05 |
| 25 | 0.000000E+00 | -1.374374E-02 | 2.507151E-03 | 3.091402E-03 | -2.170301E-03 |
| 26 | 2.206271E+00 | -8.655275E-03 | -3.789266E-03 | 4.808027E-03 | -1.758094E-03 |
| 35 | 1.984869E+00 | -3.962940E-03 | -4.556797E-03 | 1.460251E-03 | 4.761709E-04 |
| 36 | 1.923772E+00 | -4.771498E-03 | -2.671228E-03 | 3.555161E-04 | 7.686533E-04 |
| 45 | 0.000000E+00 | -4.317169E-03 | 4.671682E-04 | -1.028458E-03 | 1.397913E-03 |
| 46 | 0.000000E+00 | -4.528372E-03 | 8.747294E-04 | -1.027611E-03 | 1.277821E-03 |
| 55 | 0.000000E+00 | -1.979707E-02 | -7.954609E-03 | 6.956315E-03 | -8.526970E-03 |
| 56 | 0.000000E+00 | 3.211184E-03 | -3.487547E-02 | 2.919145E-02 | -1.756517E-02 |
| 65 | 0.000000E+00 | 2.333244E-02 | -4.643463E-02 | 3.982677E-02 | -2.118123E-02 |
| 66 | 0.000000E+00 | 7.565628E-04 | -1.902910E-02 | 1.380812E-02 | -6.247923E-03 |
| 75 | 0.000000E+00 | -5.500833E-03 | -1.276982E-02 | 7.549314E-03 | -2.474385E-03 |
| 76 | 0.000000E+00 | -1.405038E-02 | -8.262038E-03 | 5.249491E-03 | -1.584263E-03 |
| 85 | 0.000000E+00 | -3.699594E-03 | -2.821417E-03 | 6.627082E-04 | -5.810674E-05 |
| 86 | -2.897518E+01 | -5.070632E-04 | 7.496881E-04 | -7.333827E-04 | 2.090956E-04 |
| 95 | 0.000000E+00 | -1.496943E-02 | 1.302672E-03 | 9.537240E-05 | -2.993307E-05 |
| 96 | -1.029324E+01 | -1.050283E-02 | 1.301196E-03 | -9.977701E-05 | 4.479464E-06 |
| Surface | $a_{12}$ | $a_{14}$ | $a_{16}$ | $a_{18}$ | $a_{20}$ |
| 15 | 6.106297E-05 | -1.126532E-05 | 8.431299E-07 | 0.000000E+00 | 0.000000E+00 |
| 16 | 3.078731E-05 | -6.328181E-06 | 3.340835E-07 | 0.000000E+00 | 0.000000E+00 |
| 25 | 6.323516E-04 | -8.638053E-05 | 4.280255E-06 | 0.000000E+00 | 0.000000E+00 |
| 26 | 1.640458E-04 | 5.529471E-05 | -1.077941E-05 | 0.000000E+00 | 0.000000E+00 |
| 35 | -4.852096E-04 | 1.416766E-04 | -1.383115E-05 | 0.000000E+00 | 0.000000E+00 |
| 36 | -5.159895E-04 | 1.349206E-04 | -1.230050E-05 | 0.000000E+00 | 0.000000E+00 |
| 45 | -6.687857E-04 | 1.660018E-04 | -1.608132E-05 | 0.000000E+00 | 0.000000E+00 |
| 46 | -5.873181E-04 | 1.448944E-04 | -1.431327E-05 | 0.000000E+00 | 0.000000E+00 |
| 55 | 6.569919E-03 | -3.173780E-03 | 9.169932E-04 | -1.433244E-04 | 9.231815E-06 |
| 56 | 7.152739E-03 | -1.998572E-03 | 3.813445E-04 | -4.481278E-05 | 2.399681E-06 |
| 65 | 7.169500E-03 | -1.529160E-03 | 1.998958E-04 | -1.469395E-05 | 4.665014E-07 |
| 66 | 1.960745E-03 | -4.314887E-04 | 6.311335E-05 | -5.345064E-06 | 1.935754E-07 |
| 75 | 5.024458E-04 | -6.453199E-05 | 5.163913E-06 | -2.365355E-07 | 4.745476E-09 |
| 76 | 2.850096E-04 | -3.167307E-05 | 2.133053E-06 | -7.947753E-08 | 1.249195E-09 |
| 85 | -2.587760E-06 | 8.631235E-07 | -6.610791E-08 | 2.198797E-09 | -2.342300E-11 |
| 86 | -3.049263E-05 | 2.457407E-06 | -1.072088E-07 | 2.255252E-09 | -1.574900E-11 |
| 95 | 3.295794E-06 | -2.007871E-07 | 6.962311E-09 | -1.281990E-10 | 9.730000E-13 |
| 96 | -9.666812E-08 | -3.346760E-10 | 6.507500E-11 | -1.271000E-12 | 8.000000E-15 |

FIG. 29

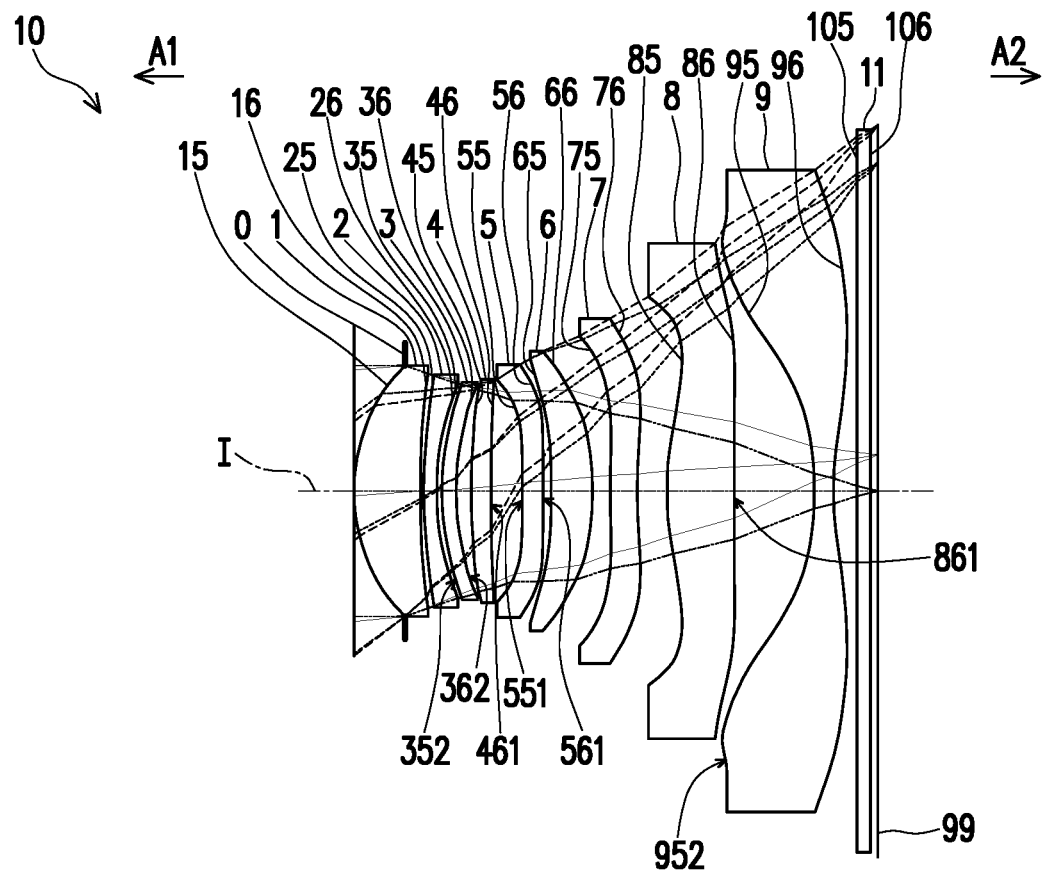
FIG. 30
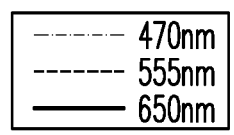
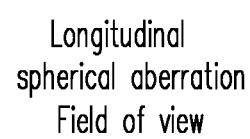
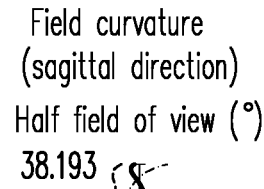
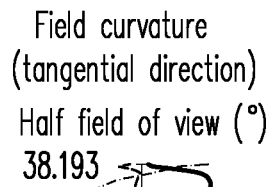
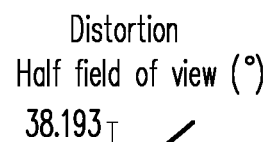
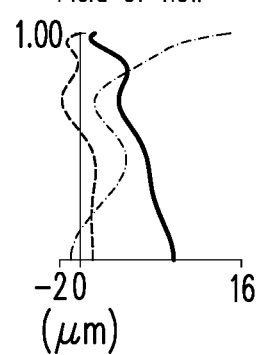
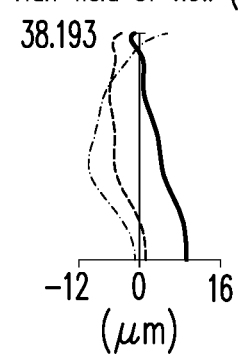
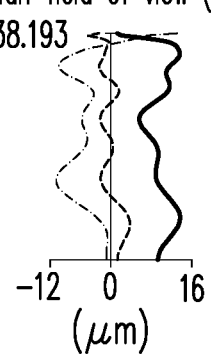
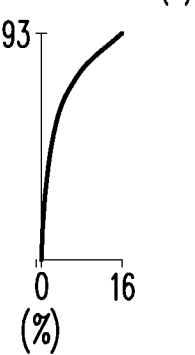
FIG. 31A  FIG. 31B  FIG. 31C  FIG. 31D

| Seventh embodiment ||||||
|---|---|---|---|---|---|
| Effective focal length = 6.367 mm. Half angle of view = 38.193°. System length = 8.278 mm. f-number = 1.600. Image height = 6.700 mm ||||||
| Element | Surface | Radius of curvature (mm) | Distance (mm) | Refractive index | Abbe number | Focal length (mm) |
| Object | | | Infinity | | | |
| Aperture stop 0 | | Infinity | -0.803 | | | |
| First lens element 1 | Object-side surface 15 | 2.996 | 1.053 | 1.545 | 55.987 | 6.412 |
| | Image-side surface 16 | 18.155 | 0.050 | | | |
| Second lens element 2 | Object-side surface 25 | 8.364 | 0.200 | 1.671 | 19.243 | -14.618 |
| | Image-side surface 26 | 4.491 | 0.086 | | | |
| Third lens element 3 | Object-side surface 35 | 4.338 | 0.223 | 1.671 | 19.243 | -453.268 |
| | Image-side surface 36 | 4.189 | 0.244 | | | |
| Fourth lens element 4 | Object-side surface 45 | 11.084 | 0.308 | 1.545 | 55.987 | 32.935 |
| | Image-side surface 46 | 28.589 | 0.484 | | | |
| Fifth lens element 5 | Object-side surface 55 | 158.630 | 0.335 | 1.545 | 55.987 | -65.063 |
| | Image-side surface 56 | 29.015 | 0.134 | | | |
| Sixth lens element 6 | Object-side surface 65 | -9.209 | 0.647 | 1.545 | 55.987 | 19.710 |
| | Image-side surface 66 | -5.087 | 0.284 | | | |
| Seventh lens element 7 | Object-side surface 75 | 16.584 | 0.428 | 1.661 | 20.373 | -19.866 |
| | Image-side surface 76 | 7.290 | 0.465 | | | |
| Eighth lens element 8 | Object-side surface 85 | 4.616 | 1.077 | 1.545 | 55.987 | 7.096 |
| | Image-side surface 86 | -22.187 | 1.254 | | | |
| Ninth lens element 9 | Object-side surface 95 | -6.016 | 0.298 | 1.545 | 55.987 | -4.646 |
| | Image-side surface 96 | 4.467 | 0.382 | | | |
| Filter 11 | Object-side surface 105 | Infinity | 0.210 | 1.517 | 64.167 | |
| | Image-side surface 106 | Infinity | 0.116 | | | |
| | Image plane 99 | Infinity | | | | |

FIG. 32

| Surface | K | $a_4$ | $a_6$ | $a_8$ | $a_{10}$ |
|---|---|---|---|---|---|
| 15 | 0.000000E+00 | 1.140610E-03 | -3.715641E-05 | 4.742239E-04 | -2.976110E-04 |
| 16 | 0.000000E+00 | -1.329866E-02 | 1.497292E-02 | -9.214196E-03 | 3.760396E-03 |
| 25 | 0.000000E+00 | -1.044067E-02 | 6.265606E-03 | -4.212437E-03 | 1.718416E-03 |
| 26 | 2.077431E+00 | 1.058662E-02 | -1.652611E-02 | 1.016328E-02 | -4.738903E-03 |
| 35 | 1.343337E+00 | -4.079207E-03 | -7.730751E-03 | 5.420338E-03 | -9.969876E-04 |
| 36 | 1.884839E+00 | -1.674027E-02 | -2.924898E-04 | 2.213901E-03 | -9.761893E-05 |
| 45 | 0.000000E+00 | -2.122797E-03 | -2.329091E-03 | 3.492838E-04 | 5.755905E-04 |
| 46 | 0.000000E+00 | -3.047368E-03 | -1.003640E-03 | -4.586697E-04 | 6.939830E-04 |
| 55 | 0.000000E+00 | -2.429089E-02 | -1.261235E-02 | 1.597535E-02 | -1.859614E-02 |
| 56 | 0.000000E+00 | -8.035087E-03 | -2.317456E-02 | 1.998571E-02 | -1.377642E-02 |
| 65 | 0.000000E+00 | 1.122228E-02 | -2.794272E-02 | 2.236903E-02 | -1.496379E-02 |
| 66 | 0.000000E+00 | 4.560953E-03 | -2.309482E-02 | 1.098592E-02 | -2.529700E-03 |
| 75 | 0.000000E+00 | -1.372299E-02 | -5.682674E-03 | 1.405276E-03 | 2.389963E-04 |
| 76 | 0.000000E+00 | -3.636796E-02 | 1.037537E-02 | -4.800864E-03 | 1.803788E-03 |
| 85 | 0.000000E+00 | -1.821787E-02 | 2.841456E-03 | -1.072107E-03 | 3.412427E-04 |
| 86 | 0.000000E+00 | 1.342838E-02 | -3.740953E-03 | 4.280454E-04 | 7.568249E-06 |
| 95 | 0.000000E+00 | -1.932306E-02 | 3.684959E-03 | -6.634313E-04 | 1.078106E-04 |
| 96 | -1.157005E+01 | -1.313275E-02 | 2.179407E-03 | -2.786396E-04 | 2.551367E-05 |
| Surface | $a_{12}$ | $a_{14}$ | $a_{16}$ | $a_{18}$ | $a_{20}$ |
| 15 | 1.168005E-04 | -2.349149E-05 | 2.069257E-06 | 0.000000E+00 | 0.000000E+00 |
| 16 | -9.380124E-04 | 1.309664E-04 | -7.779725E-06 | 0.000000E+00 | 0.000000E+00 |
| 25 | -3.164001E-04 | 1.712660E-05 | 8.065763E-07 | 0.000000E+00 | 0.000000E+00 |
| 26 | 1.318991E-03 | -1.771311E-04 | 8.453397E-06 | 0.000000E+00 | 0.000000E+00 |
| 35 | -6.717581E-04 | 3.302246E-04 | -3.904350E-05 | 0.000000E+00 | 0.000000E+00 |
| 36 | -3.766790E-04 | 1.377317E-04 | -1.234683E-05 | 0.000000E+00 | 0.000000E+00 |
| 45 | -2.706277E-04 | 1.208624E-04 | -2.045326E-05 | 0.000000E+00 | 0.000000E+00 |
| 46 | -4.012944E-04 | 1.661477E-04 | -2.412243E-05 | 0.000000E+00 | 0.000000E+00 |
| 55 | 1.362544E-02 | -6.675395E-03 | 2.068742E-03 | -3.578175E-04 | 2.631074E-05 |
| 56 | 6.394276E-03 | -1.855547E-03 | 3.026294E-04 | -2.138066E-05 | 1.600919E-07 |
| 65 | 7.999703E-03 | -2.793096E-03 | 5.707492E-04 | -6.136698E-05 | 2.664609E-06 |
| 66 | -4.144610E-05 | 2.918095E-04 | -1.033561E-04 | 1.538402E-05 | -8.489546E-07 |
| 75 | -1.654493E-04 | 3.472723E-05 | -4.528063E-06 | 3.874359E-07 | -1.515579E-08 |
| 76 | -4.580478E-04 | 7.610852E-05 | -8.073264E-06 | 4.996029E-07 | -1.361793E-08 |
| 85 | -7.898926E-05 | 1.181204E-05 | -1.108329E-06 | 5.875503E-08 | -1.312877E-09 |
| 86 | -9.710739E-06 | 1.338856E-06 | -8.706064E-08 | 2.814031E-09 | -3.638100E-11 |
| 95 | -1.072415E-05 | 6.309258E-07 | -2.187470E-08 | 4.171890E-10 | -3.400000E-12 |
| 96 | -1.609341E-06 | 6.804170E-08 | -1.850039E-09 | 2.941800E-11 | -2.090000E-13 |

FIG. 33

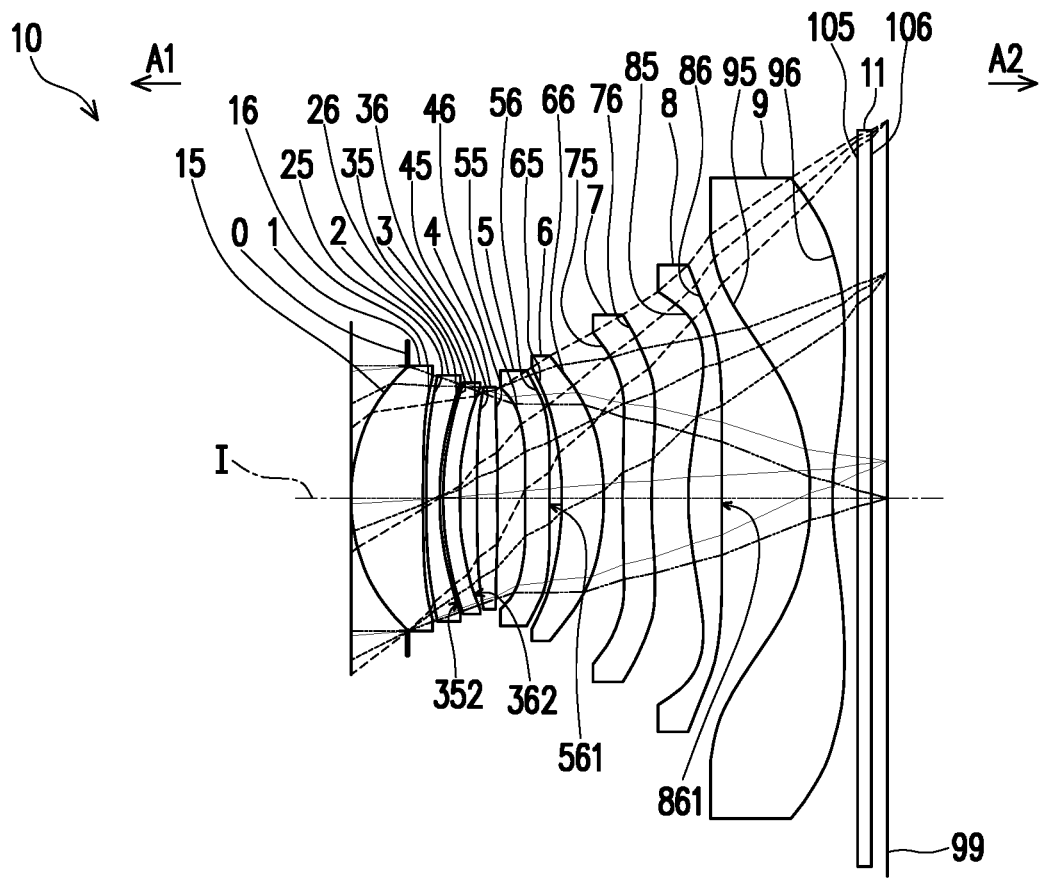
FIG. 34
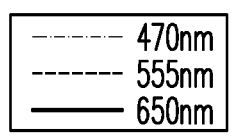
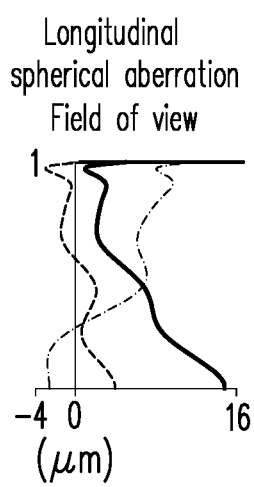
FIG. 35A
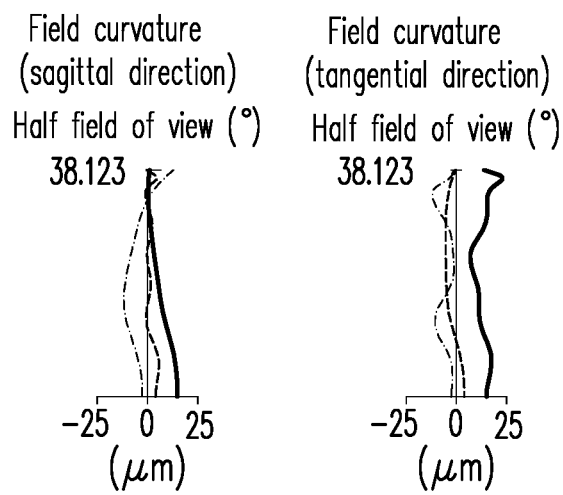
FIG. 35B  FIG. 35C
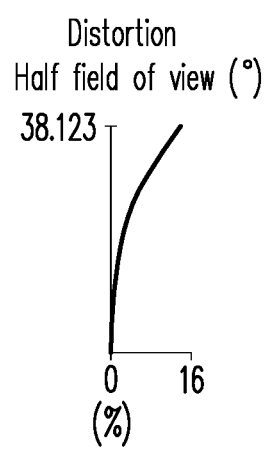
FIG. 35D

| Eighth embodiment |||||||
|---|---|---|---|---|---|---|
| | Effective focal length = 6.491 mm. Half angle of view = 38.123°. System length = 8.193 mm. f-number = 1.600. Image height = 5.800 mm |||||||
| Element | Surface | Radius of curvature (mm) | Distance (mm) | Refractive index | Abbe number | Focal length (mm) |
| Object | | | Infinity | | | |
| Aperture stop 0 | | Infinity | -0.871 | | | |
| First lens element 1 | Object-side surface 15 | 2.929 | 1.088 | 1.545 | 55.987 | 6.562 |
| | Image-side surface 16 | 13.912 | 0.050 | | | |
| Second lens element 2 | Object-side surface 25 | 8.304 | 0.212 | 1.671 | 19.243 | -16.964 |
| | Image-side surface 26 | 4.771 | 0.050 | | | |
| Third lens element 3 | Object-side surface 35 | 4.575 | 0.253 | 1.671 | 19.243 | -260.168 |
| | Image-side surface 36 | 4.359 | 0.266 | | | |
| Fourth lens element 4 | Object-side surface 45 | 15.812 | 0.310 | 1.545 | 55.987 | 27.800 |
| | Image-side surface 46 | -381.406 | 0.430 | | | |
| Fifth lens element 5 | Object-side surface 55 | -92.414 | 0.361 | 1.671 | 19.243 | -43.719 |
| | Image-side surface 56 | 43.664 | 0.195 | | | |
| Sixth lens element 6 | Object-side surface 65 | -5.950 | 0.641 | 1.545 | 55.987 | 29.900 |
| | Image-side surface 66 | -4.527 | 0.289 | | | |
| Seventh lens element 7 | Object-side surface 75 | 10.040 | 0.454 | 1.661 | 20.373 | -37.577 |
| | Image-side surface 76 | 7.039 | 0.550 | | | |
| Eighth lens element 8 | Object-side surface 85 | 4.704 | 0.521 | 1.545 | 55.987 | 7.077 |
| | Image-side surface 86 | -20.855 | 1.334 | | | |
| Ninth lens element 9 | Object-side surface 95 | -5.742 | 0.346 | 1.545 | 55.987 | -4.565 |
| | Image-side surface 96 | 4.501 | 0.382 | | | |
| Filter 11 | Object-side surface 105 | Infinity | 0.210 | 1.517 | 64.167 | |
| | Image-side surface 106 | Infinity | 0.250 | | | |
| | Image plane 99 | Infinity | | | | |

FIG. 36

| Surface | K | $a_4$ | $a_6$ | $a_8$ | $a_{10}$ |
|---|---|---|---|---|---|
| 15 | 0.000000E+00 | 1.034893E-03 | 2.983881E-05 | 3.457737E-04 | -2.064705E-04 |
| 16 | 0.000000E+00 | -1.291297E-02 | 1.313513E-02 | -7.042460E-03 | 2.648476E-03 |
| 25 | 0.000000E+00 | -1.019426E-02 | 4.718124E-03 | -1.490830E-03 | 5.599129E-06 |
| 26 | 1.978798E+00 | 1.378221E-02 | -2.382109E-02 | 1.709070E-02 | -8.384292E-03 |
| 35 | 1.571965E+00 | 1.483372E-03 | -1.744682E-02 | 1.480300E-02 | -7.196115E-03 |
| 36 | 1.733142E+00 | -1.392434E-02 | -1.842203E-03 | 4.254213E-03 | -2.372686E-03 |
| 45 | 0.000000E+00 | -1.936919E-03 | -2.666154E-03 | 1.211461E-03 | 1.955795E-04 |
| 46 | 0.000000E+00 | -3.227407E-03 | -1.308555E-03 | 3.261061E-04 | 6.695669E-04 |
| 55 | 0.000000E+00 | -2.458951E-02 | -1.277626E-02 | 1.625759E-02 | -1.868585E-02 |
| 56 | 0.000000E+00 | -1.289111E-02 | -1.509375E-02 | 1.155400E-02 | -7.799993E-03 |
| 65 | 0.000000E+00 | 1.028849E-02 | -2.317530E-02 | 1.668772E-02 | -1.198247E-02 |
| 66 | 0.000000E+00 | 2.727721E-03 | -1.530698E-02 | 3.646342E-03 | 1.267699E-03 |
| 75 | 0.000000E+00 | -1.963798E-02 | 4.770949E-03 | -4.772561E-03 | 2.138272E-03 |
| 76 | 0.000000E+00 | -4.006432E-02 | 1.571540E-02 | -7.012677E-03 | 2.064545E-03 |
| 85 | 0.000000E+00 | -1.114885E-02 | -1.341991E-03 | 2.153649E-04 | 7.356747E-05 |
| 86 | 0.000000E+00 | 2.052079E-02 | -8.039619E-03 | 1.273334E-03 | -1.486432E-05 |
| 95 | 0.000000E+00 | -1.876014E-02 | 2.588097E-03 | -2.634996E-04 | 4.161369E-05 |
| 96 | -1.200438E+01 | -1.487946E-02 | 2.432505E-03 | -2.842337E-04 | 2.395339E-05 |
| Surface | $a_{12}$ | $a_{14}$ | $a_{16}$ | $a_{18}$ | $a_{20}$ |
| 15 | 8.262289E-05 | -1.662767E-05 | 1.492165E-06 | 0.000000E+00 | 0.000000E+00 |
| 16 | -6.569355E-04 | 1.008348E-04 | -7.115505E-06 | 0.000000E+00 | 0.000000E+00 |
| 25 | 1.560009E-04 | -3.499219E-05 | 1.822088E-06 | 0.000000E+00 | 0.000000E+00 |
| 26 | 2.227696E-03 | -2.428785E-04 | 3.695749E-06 | 0.000000E+00 | 0.000000E+00 |
| 35 | 1.813695E-03 | -1.874119E-04 | 3.994891E-06 | 0.000000E+00 | 0.000000E+00 |
| 36 | 8.021471E-04 | -1.514285E-04 | 1.345407E-05 | 0.000000E+00 | 0.000000E+00 |
| 45 | -4.852008E-04 | 2.639393E-04 | -4.090012E-05 | 0.000000E+00 | 0.000000E+00 |
| 46 | -7.219919E-04 | 3.126252E-04 | -4.314332E-05 | 0.000000E+00 | 0.000000E+00 |
| 55 | 1.397080E-02 | -6.949907E-03 | 2.126862E-03 | -3.556276E-04 | 2.491030E-05 |
| 56 | 3.851221E-03 | -1.251485E-03 | 2.389146E-04 | -2.259753E-05 | 7.678167E-07 |
| 65 | 7.102918E-03 | -2.607011E-03 | 5.393704E-04 | -5.742179E-05 | 2.427806E-06 |
| 66 | -1.326318E-03 | 5.651308E-04 | -1.341668E-04 | 1.648057E-05 | -8.065095E-07 |
| 75 | -5.560986E-04 | 9.591158E-05 | -1.145181E-05 | 8.592197E-07 | -2.913603E-08 |
| 76 | -3.997090E-04 | 5.209779E-05 | -4.518332E-06 | 2.393403E-07 | -5.824473E-09 |
| 85 | -3.832421E-05 | 6.923319E-06 | -6.590076E-07 | 3.321679E-08 | -6.928690E-10 |
| 86 | -3.076182E-05 | 5.327409E-06 | -4.103638E-07 | 1.546860E-08 | -2.318560E-10 |
| 95 | -4.633557E-06 | 2.971340E-07 | -1.098178E-08 | 2.209260E-10 | -1.892000E-12 |
| 96 | -1.444622E-06 | 5.932800E-08 | -1.581028E-09 | 2.526400E-11 | -1.890000E-13 |

FIG. 37

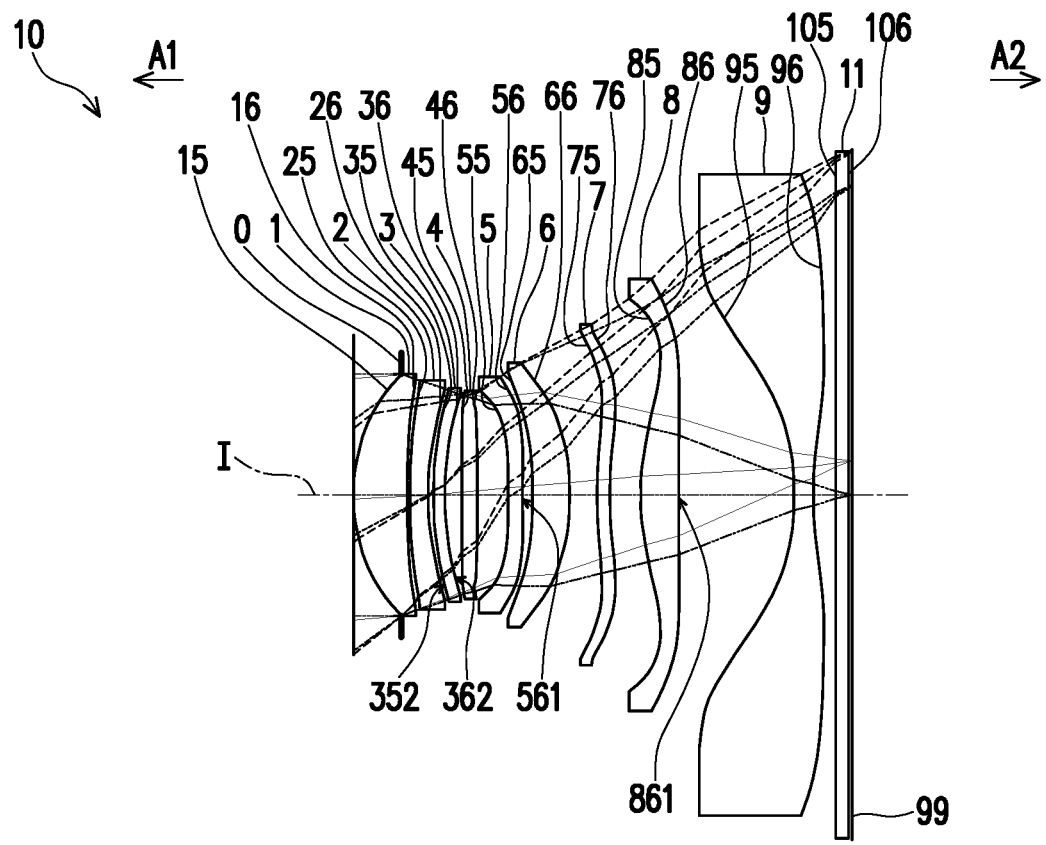
FIG. 38
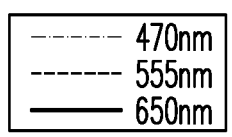
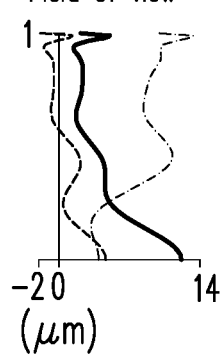
FIG. 39A
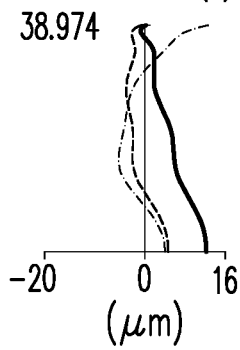
FIG. 39B
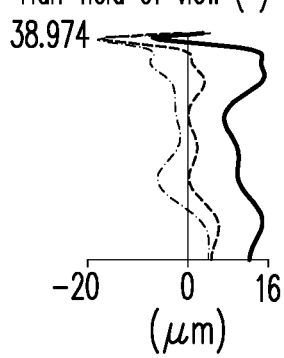
FIG. 39C
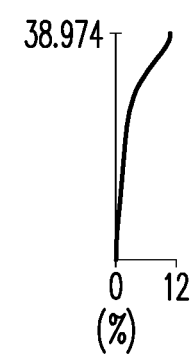
FIG. 39D

| Ninth embodiment | | | | | | |
|---|---|---|---|---|---|---|
| Effective focal length = 6.482 mm. Half angle of view = 38.974°. System length = 8.360 mm. f-number = 1.600. Image height = 5.800 mm | | | | | | |
| Element | Surface | Radius of curvature (mm) | Distance (mm) | Refractive index | Abbe number | Focal length (mm) |
| Object | | | Infinity | | | |
| Aperture stop 0 | | Infinity | -0.808 | | | |
| First lens element 1 | Object-side surface 15 | 3.126 | 0.901 | 1.545 | 55.987 | 7.088 |
| | Image-side surface 16 | 14.562 | 0.050 | | | |
| Second lens element 2 | Object-side surface 25 | 8.709 | 0.301 | 1.671 | 19.243 | -19.073 |
| | Image-side surface 26 | 5.130 | 0.087 | | | |
| Third lens element 3 | Object-side surface 35 | 5.176 | 0.200 | 1.671 | 19.243 | -581.081 |
| | Image-side surface 36 | 5.029 | 0.276 | | | |
| Fourth lens element 4 | Object-side surface 45 | 32.481 | 0.267 | 1.545 | 55.987 | 35.503 |
| | Image-side surface 46 | -47.996 | 0.513 | | | |
| Fifth lens element 5 | Object-side surface 55 | -26.971 | 0.244 | 1.671 | 19.243 | -30.574 |
| | Image-side surface 56 | 89.642 | 0.165 | | | |
| Sixth lens element 6 | Object-side surface 65 | -7.268 | 0.621 | 1.545 | 55.987 | 25.238 |
| | Image-side surface 66 | -4.903 | 0.463 | | | |
| Seventh lens element 7 | Object-side surface 75 | 6.854 | 0.205 | 1.661 | 20.373 | -31.181 |
| | Image-side surface 76 | 5.093 | 0.526 | | | |
| Eighth lens element 8 | Object-side surface 85 | 4.328 | 0.635 | 1.545 | 55.987 | 7.201 |
| | Image-side surface 86 | -40.911 | 1.933 | | | |
| Ninth lens element 9 | Object-side surface 95 | -5.695 | 0.323 | 1.545 | 55.987 | -5.033 |
| | Image-side surface 96 | 5.421 | 0.382 | | | |
| Filter 11 | Object-side surface 105 | Infinity | 0.210 | 1.517 | 64.167 | |
| | Image-side surface 106 | Infinity | 0.059 | | | |
| | Image plane 99 | Infinity | | | | |

FIG. 40

| Surface | K | $a_4$ | $a_6$ | $a_8$ | $a_{10}$ |
|---|---|---|---|---|---|
| 15 | 0.000000E+00 | 1.156461E-03 | 1.532711E-04 | 2.730180E-04 | -1.410958E-04 |
| 16 | 0.000000E+00 | -1.249143E-02 | 1.142901E-02 | -5.096788E-03 | 1.548626E-03 |
| 25 | 0.000000E+00 | -1.055119E-02 | 5.337322E-03 | -1.250403E-03 | -2.344256E-04 |
| 26 | 1.962665E+00 | 8.877960E-03 | -1.565548E-02 | 9.150794E-03 | -3.470376E-03 |
| 35 | 1.592474E+00 | 6.504653E-04 | -1.502029E-02 | 1.038573E-02 | -3.496835E-03 |
| 36 | 1.811310E+00 | -1.077922E-02 | -5.441724E-03 | 5.703158E-03 | -1.979321E-03 |
| 45 | 0.000000E+00 | -2.561035E-03 | -4.632176E-03 | 2.133042E-03 | 3.977665E-04 |
| 46 | 0.000000E+00 | -8.221463E-04 | -3.599397E-03 | 1.358989E-03 | 6.418327E-04 |
| 55 | 0.000000E+00 | -1.823058E-02 | -2.438326E-02 | 2.603522E-02 | -2.492470E-02 |
| 56 | 0.000000E+00 | -3.604455E-03 | -2.980439E-02 | 2.402314E-02 | -1.484811E-02 |
| 65 | 0.000000E+00 | 8.545811E-03 | -2.360645E-02 | 1.443154E-02 | -6.130384E-03 |
| 66 | 0.000000E+00 | 1.463041E-05 | -1.624785E-02 | 7.297642E-03 | -1.560656E-03 |
| 75 | 0.000000E+00 | -1.620738E-02 | 3.482883E-04 | -7.213593E-04 | 3.811851E-04 |
| 76 | 0.000000E+00 | -3.711138E-02 | 1.031171E-02 | -4.202927E-03 | 1.284451E-03 |
| 85 | 0.000000E+00 | -1.128324E-02 | -3.288554E-04 | 4.722643E-05 | 1.263922E-05 |
| 86 | 0.000000E+00 | 1.273084E-02 | -3.727252E-03 | 2.262688E-04 | 9.474820E-05 |
| 95 | 0.000000E+00 | -2.070180E-02 | 3.356178E-03 | -3.425948E-04 | 4.000237E-05 |
| 96 | -7.428445E+00 | -1.448054E-02 | 2.188590E-03 | -2.482335E-04 | 2.158156E-05 |
| Surface | $a_{12}$ | $a_{14}$ | $a_{16}$ | $a_{18}$ | $a_{20}$ |
| 15 | 5.404420E-05 | -1.035610E-05 | 9.460265E-07 | 0.000000E+00 | 0.000000E+00 |
| 16 | -3.149168E-04 | 4.314826E-05 | -3.098338E-06 | 0.000000E+00 | 0.000000E+00 |
| 25 | 2.099939E-04 | -3.979833E-05 | 1.986185E-06 | 0.000000E+00 | 0.000000E+00 |
| 26 | 4.455924E-04 | 1.029472E-04 | -2.451467E-05 | 0.000000E+00 | 0.000000E+00 |
| 35 | 2.260032E-04 | 1.661709E-04 | -2.866992E-05 | 0.000000E+00 | 0.000000E+00 |
| 36 | 2.824584E-04 | 1.588873E-05 | -6.208221E-06 | 0.000000E+00 | 0.000000E+00 |
| 45 | -5.631992E-04 | 2.373989E-04 | -3.520275E-05 | 0.000000E+00 | 0.000000E+00 |
| 46 | -6.593511E-04 | 2.605932E-04 | -3.625008E-05 | 0.000000E+00 | 0.000000E+00 |
| 55 | 1.674944E-02 | -7.761353E-03 | 2.311989E-03 | -3.920675E-04 | 2.859942E-05 |
| 56 | 6.679175E-03 | -2.104692E-03 | 4.381492E-04 | -5.356049E-05 | 2.922002E-06 |
| 65 | 2.363006E-03 | -7.274395E-04 | 1.441777E-04 | -1.540756E-05 | 6.570280E-07 |
| 66 | -6.412112E-05 | 1.751385E-04 | -5.636364E-05 | 8.069755E-06 | -4.476688E-07 |
| 75 | -1.017851E-04 | 1.696908E-05 | -1.942374E-06 | 1.444298E-07 | -4.929393E-09 |
| 76 | -2.773167E-04 | 4.125854E-05 | -4.075155E-06 | 2.430421E-07 | -6.531768E-09 |
| 85 | -4.152420E-06 | 1.019821E-07 | 5.197739E-08 | -5.336920E-09 | 1.595830E-10 |
| 86 | -2.770928E-05 | 3.396705E-06 | -2.203528E-07 | 7.416413E-09 | -1.027230E-10 |
| 95 | -3.895848E-06 | 2.487415E-07 | -9.643671E-09 | 2.071580E-10 | -1.897000E-12 |
| 96 | -1.330132E-06 | 5.448249E-08 | -1.403718E-09 | 2.064900E-11 | -1.330000E-13 |

FIG. 41

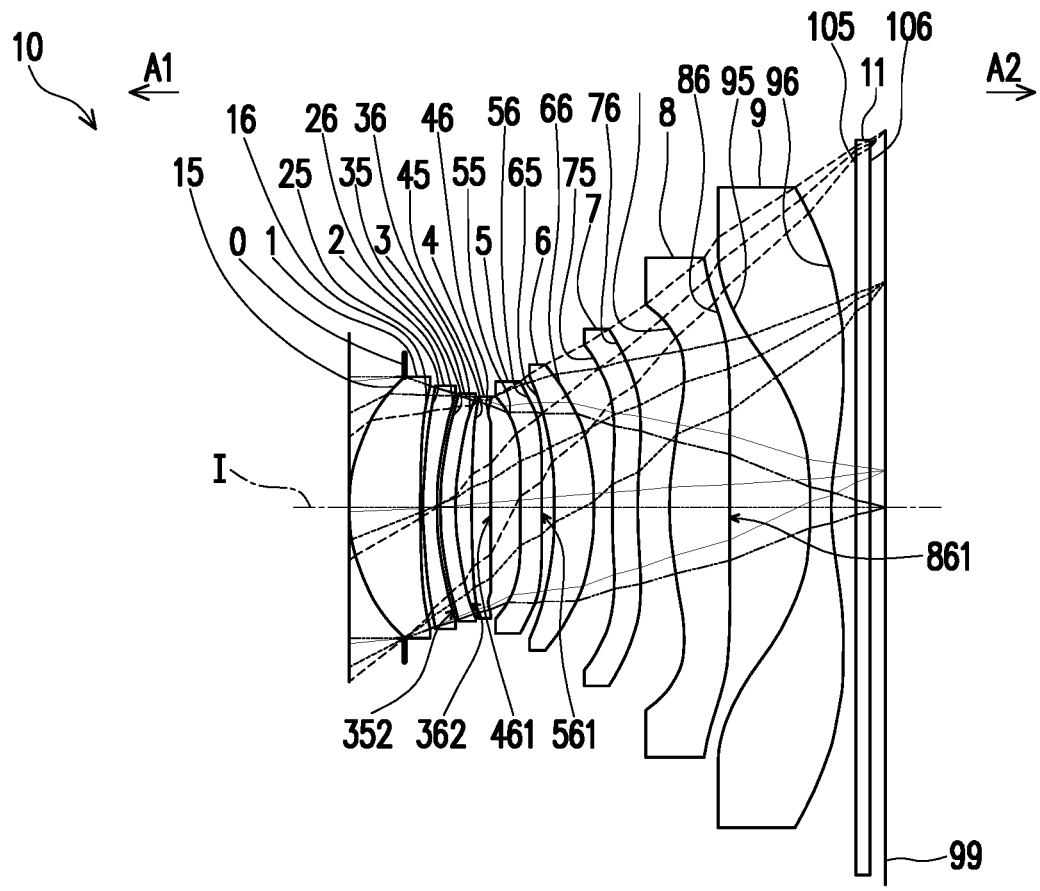
FIG. 42
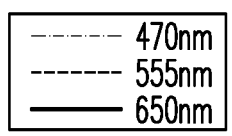
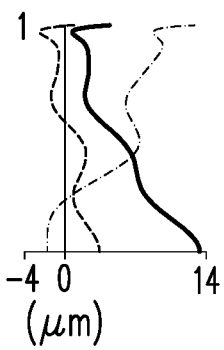
| Longitudinal spherical aberration Field of view | Field curvature (sagittal direction) Half field of view (°) | Field curvature (tangential direction) Half field of view (°) | Distortion Half field of view (°) |
FIG. 43A  FIG. 43B  FIG. 43C  FIG. 43D

| Tenth embodiment |||||||
|---|---|---|---|---|---|---|
| Effective focal length = 6.448 mm.Half angle of view = 38.487°.System length = 8.214 mm.f-number = 1.600.Image height = 5.800 mm |||||||
| Element | Surface | Radius of curvature (mm) | Distance (mm) | Refractive index | Abbe number | Focal length (mm) |
| Object | | | Infinity | | | |
| Aperture stop 0 | | Infinity | -0.848 | | | |
| First lens element 1 | Object-side surface 15 | 2.946 | 1.090 | 1.545 | 55.987 | 6.579 |
| | Image-side surface 16 | 14.212 | 0.050 | | | |
| Second lens element 2 | Object-side surface 25 | 8.321 | 0.205 | 1.671 | 19.243 | -18.428 |
| | Image-side surface 26 | 4.944 | 0.058 | | | |
| Third lens element 3 | Object-side surface 35 | 4.886 | 0.230 | 1.671 | 19.243 | -100.647 |
| | Image-side surface 36 | 4.473 | 0.241 | | | |
| Fourth lens element 4 | Object-side surface 45 | 14.009 | 0.304 | 1.545 | 55.987 | 28.909 |
| | Image-side surface 46 | 123.102 | 0.448 | | | |
| Fifth lens element 5 | Object-side surface 55 | -56.983 | 0.328 | 1.671 | 19.243 | -49.568 |
| | Image-side surface 56 | 81.979 | 0.188 | | | |
| Sixth lens element 6 | Object-side surface 65 | -7.611 | 0.607 | 1.545 | 55.987 | 29.255 |
| | Image-side surface 66 | -5.301 | 0.292 | | | |
| Seventh lens element 7 | Object-side surface 75 | 11.948 | 0.384 | 1.640 | 23.529 | -31.319 |
| | Image-side surface 76 | 7.411 | 0.490 | | | |
| Eighth lens element 8 | Object-side surface 85 | 4.498 | 0.918 | 1.545 | 55.987 | 7.064 |
| | Image-side surface 86 | -25.188 | 1.247 | | | |
| Ninth lens element 9 | Object-side surface 95 | -5.816 | 0.317 | 1.545 | 55.987 | -4.569 |
| | Image-side surface 96 | 4.456 | 0.382 | | | |
| Filter 11 | Object-side surface 105 | Infinity | 0.210 | 1.517 | 64.167 | |
| | Image-side surface 106 | Infinity | 0.226 | | | |
| | Image plane 99 | Infinity | | | | |

FIG. 44

| Surface | K | $a_4$ | $a_6$ | $a_8$ | $a_{10}$ |
|---|---|---|---|---|---|
| 15 | 0.000000E+00 | 1.017352E-03 | -9.604189E-06 | 3.922219E-04 | -2.328483E-04 |
| 16 | 0.000000E+00 | -1.349197E-02 | 1.426716E-02 | -8.114574E-03 | 3.238670E-03 |
| 25 | 0.000000E+00 | -1.051108E-02 | 5.272946E-03 | -2.364775E-03 | 5.526544E-04 |
| 26 | 1.973726E+00 | 1.372655E-02 | -2.341225E-02 | 1.686298E-02 | -8.841718E-03 |
| 35 | 1.577860E+00 | 2.044311E-04 | -1.685036E-02 | 1.555951E-02 | -8.251573E-03 |
| 36 | 1.707420E+00 | -1.508340E-02 | -2.276603E-03 | 5.688115E-03 | -3.278685E-03 |
| 45 | 0.000000E+00 | -1.631917E-03 | -3.630606E-03 | 2.327965E-03 | -7.332781E-04 |
| 46 | 0.000000E+00 | -2.126522E-03 | -2.120349E-03 | 1.001756E-03 | 4.326863E-05 |
| 55 | 0.000000E+00 | -2.396914E-02 | -1.135114E-02 | 1.179086E-02 | -1.295476E-02 |
| 56 | 0.000000E+00 | -1.200161E-02 | -1.733228E-02 | 1.408699E-02 | -9.777598E-03 |
| 65 | 0.000000E+00 | 1.041226E-02 | -2.801976E-02 | 2.398638E-02 | -1.775798E-02 |
| 66 | 0.000000E+00 | 5.377623E-03 | -2.285685E-02 | 1.057459E-02 | -2.604604E-03 |
| 75 | 0.000000E+00 | -1.531641E-02 | -1.155236E-03 | -1.369758E-03 | 9.104050E-04 |
| 76 | 0.000000E+00 | -4.023860E-02 | 1.422969E-02 | -6.554356E-03 | 2.102848E-03 |
| 85 | 0.000000E+00 | -1.773922E-02 | 1.191269E-03 | -3.419488E-04 | 1.240325E-04 |
| 86 | 0.000000E+00 | 1.705193E-02 | -6.017019E-03 | 9.838706E-04 | -6.822436E-05 |
| 95 | 0.000000E+00 | -1.790906E-02 | 2.355786E-03 | -2.899934E-04 | 5.694221E-05 |
| 96 | -1.324213E+01 | -1.317330E-02 | 1.825424E-03 | -1.898720E-04 | 1.417369E-05 |
| Surface | $a_{12}$ | $a_{14}$ | $a_{16}$ | $a_{18}$ | $a_{20}$ |
| 15 | 9.080714E-05 | -1.799828E-05 | 1.587653E-06 | 0.000000E+00 | 0.000000E+00 |
| 16 | -8.446770E-04 | 1.336236E-04 | -9.555664E-06 | 0.000000E+00 | 0.000000E+00 |
| 25 | -9.832948E-06 | -7.580471E-06 | -3.287642E-07 | 0.000000E+00 | 0.000000E+00 |
| 26 | 2.640414E-03 | -3.568596E-04 | 1.387124E-05 | 0.000000E+00 | 0.000000E+00 |
| 35 | 2.359386E-03 | -3.169993E-04 | 1.560255E-05 | 0.000000E+00 | 0.000000E+00 |
| 36 | 1.150824E-03 | -2.431155E-04 | 2.435988E-05 | 0.000000E+00 | 0.000000E+00 |
| 45 | 3.266965E-05 | 1.108430E-04 | -2.330764E-05 | 0.000000E+00 | 0.000000E+00 |
| 46 | -3.762662E-04 | 2.230326E-04 | -3.465873E-05 | 0.000000E+00 | 0.000000E+00 |
| 55 | 9.316991E-03 | -4.576794E-03 | 1.420400E-03 | -2.455100E-04 | 1.808525E-05 |
| 56 | 4.820723E-03 | -1.488608E-03 | 2.510760E-04 | -1.765437E-05 | 1.307815E-07 |
| 65 | 1.025553E-02 | -3.741104E-03 | 7.849360E-04 | -8.611321E-05 | 3.814286E-06 |
| 66 | 1.622563E-04 | 1.957038E-04 | -8.159923E-05 | 1.289932E-05 | -7.340647E-07 |
| 75 | -1.958559E-04 | 1.509382E-05 | 2.163151E-07 | -7.007233E-08 | 1.720568E-09 |
| 76 | -4.337283E-04 | 5.752487E-05 | -4.888640E-06 | 2.522085E-07 | -6.141007E-09 |
| 85 | -3.466170E-05 | 5.808423E-06 | -6.045127E-07 | 3.588875E-08 | -8.963730E-10 |
| 86 | -4.427693E-06 | 1.248463E-06 | -9.782007E-08 | 3.483228E-09 | -4.805900E-11 |
| 95 | -6.752661E-06 | 4.432953E-07 | -1.655709E-08 | 3.338060E-10 | -2.844000E-12 |
| 96 | -7.461055E-07 | 2.711655E-08 | -6.723920E-10 | 1.091900E-11 | -9.100000E-14 |

FIG. 45

| Condition | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| T1 | 1.028 | 1.063 | 0.910 | 1.102 | 1.154 | 1.085 | 1.053 | 1.088 | 0.901 | 1.090 |
| G12 | 0.108 | 0.050 | 0.092 | 0.050 | 0.050 | 0.050 | 0.050 | 0.050 | 0.050 | 0.050 |
| T2 | 0.303 | 0.204 | 0.272 | 0.238 | 0.234 | 0.205 | 0.200 | 0.212 | 0.301 | 0.205 |
| G23 | 0.472 | 0.075 | 0.107 | 0.087 | 0.080 | 0.242 | 0.086 | 0.050 | 0.087 | 0.058 |
| T3 | 0.309 | 0.202 | 0.200 | 0.228 | 0.282 | 0.240 | 0.223 | 0.253 | 0.200 | 0.230 |
| G34 | 0.067 | 0.222 | 0.226 | 0.317 | 0.234 | 0.425 | 0.244 | 0.266 | 0.276 | 0.241 |
| T4 | 0.672 | 0.310 | 0.346 | 0.344 | 0.319 | 0.279 | 0.308 | 0.310 | 0.267 | 0.304 |
| G45 | 0.106 | 0.426 | 0.636 | 0.559 | 0.614 | 0.480 | 0.484 | 0.430 | 0.513 | 0.448 |
| T5 | 0.374 | 0.360 | 0.368 | 0.237 | 0.281 | 0.262 | 0.335 | 0.361 | 0.244 | 0.328 |
| G56 | 0.394 | 0.254 | 0.170 | 0.106 | 0.094 | 0.057 | 0.134 | 0.195 | 0.165 | 0.188 |
| T6 | 0.436 | 0.520 | 0.499 | 0.603 | 0.547 | 0.481 | 0.647 | 0.641 | 0.621 | 0.607 |
| G67 | 0.083 | 0.234 | 0.299 | 0.428 | 0.381 | 0.420 | 0.284 | 0.289 | 0.463 | 0.292 |
| T7 | 0.571 | 0.348 | 0.237 | 0.284 | 0.312 | 0.302 | 0.428 | 0.454 | 0.205 | 0.384 |
| G78 | 0.352 | 0.393 | 0.247 | 0.558 | 0.496 | 0.495 | 0.465 | 0.550 | 0.526 | 0.490 |
| T8 | 0.703 | 0.972 | 1.491 | 0.907 | 1.114 | 1.155 | 1.077 | 0.521 | 0.635 | 0.918 |
| G89 | 0.870 | 1.227 | 1.128 | 1.618 | 1.499 | 1.162 | 1.254 | 1.334 | 1.933 | 1.247 |
| T9 | 0.545 | 0.687 | 0.648 | 0.398 | 0.278 | 0.667 | 0.298 | 0.346 | 0.323 | 0.317 |
| G9F | 0.445 | 0.382 | 0.400 | 0.582 | 0.582 | 0.582 | 0.382 | 0.382 | 0.382 | 0.382 |
| TF | 0.308 | 0.210 | 0.210 | 0.210 | 0.210 | 0.210 | 0.210 | 0.210 | 0.210 | 0.210 |
| GFP | 0.247 | 0.050 | 0.356 | 0.091 | 0.058 | 0.107 | 0.116 | 0.250 | 0.059 | 0.226 |
| BFL | 1.001 | 0.642 | 0.966 | 0.882 | 0.850 | 0.899 | 0.708 | 0.842 | 0.650 | 0.817 |
| EFL | 6.466 | 6.302 | 6.783 | 7.001 | 6.865 | 7.046 | 6.367 | 6.491 | 6.482 | 6.448 |
| TTL | 8.394 | 8.188 | 8.843 | 8.945 | 8.819 | 8.906 | 8.278 | 8.193 | 8.360 | 8.214 |
| TL | 7.393 | 7.547 | 7.876 | 8.062 | 7.969 | 8.007 | 7.570 | 7.351 | 7.710 | 7.396 |
| ALT | 4.942 | 4.666 | 4.971 | 4.340 | 4.522 | 4.676 | 4.570 | 4.186 | 3.697 | 4.383 |
| AAG | 2.452 | 2.881 | 2.906 | 3.722 | 3.448 | 3.331 | 3.000 | 3.165 | 4.013 | 3.014 |
| ImgH | 4.320 | 5.800 | 6.700 | 6.700 | 6.700 | 6.700 | 5.800 | 5.800 | 5.800 | 5.800 |
| Fno | 1.600 | 1.600 | 1.600 | 1.600 | 1.600 | 1.600 | 1.600 | 1.600 | 1.600 | 1.600 |
| V1 | 55.987 | 55.987 | 55.987 | 55.987 | 55.987 | 55.987 | 55.987 | 55.987 | 55.987 | 55.987 |
| V2 | 19.243 | 19.243 | 19.243 | 19.243 | 19.243 | 19.243 | 19.243 | 19.243 | 19.243 | 19.243 |
| V3 | 19.243 | 19.243 | 19.243 | 19.243 | 19.243 | 19.243 | 19.243 | 19.243 | 19.243 | 19.243 |
| V4 | 55.987 | 55.987 | 55.987 | 55.987 | 55.987 | 55.987 | 55.987 | 55.987 | 55.987 | 55.987 |
| V5 | 55.987 | 19.243 | 19.243 | 19.243 | 20.373 | 19.243 | 55.987 | 19.243 | 19.243 | 19.243 |
| V6 | 55.987 | 55.987 | 55.987 | 55.987 | 49.922 | 55.987 | 55.987 | 55.987 | 55.987 | 55.987 |
| V7 | 20.373 | 55.987 | 20.373 | 20.373 | 20.373 | 20.373 | 20.373 | 20.373 | 20.373 | 23.529 |
| V8 | 55.987 | 55.987 | 55.987 | 55.987 | 49.922 | 55.987 | 55.987 | 55.987 | 55.987 | 55.987 |
| V9 | 55.987 | 20.373 | 55.987 | 55.987 | 55.987 | 55.987 | 55.987 | 55.987 | 55.987 | 55.987 |

FIG. 46

| Condition | First embodiment | Second embodiment | Third embodiment | Fourth embodiment | Fifth embodiment | Sixth embodiment | Seventh embodiment | Eighth embodiment | Ninth embodiment | Tenth embodiment |
|---|---|---|---|---|---|---|---|---|---|---|
| ImgH/Fno | 2.700 | 3.625 | 4.188 | 4.188 | 4.188 | 4.188 | 3.625 | 3.625 | 3.625 | 3.625 |
| ALT/(T1+G78) | 3.580 | 3.205 | 4.298 | 2.615 | 2.741 | 2.960 | 3.011 | 2.555 | 2.589 | 2.774 |
| V2+V4+V5+V6 | 187.204 | 150.460 | 150.460 | 150.460 | 145.525 | 150.460 | 187.204 | 150.460 | 150.460 | 150.460 |
| (T4+T5+T8)/T3 | 5.656 | 8.107 | 11.023 | 6.531 | 6.083 | 7.052 | 7.725 | 4.701 | 5.728 | 6.749 |
| EFL/(AAG+T2) | 2.347 | 2.043 | 2.135 | 1.768 | 1.864 | 1.993 | 1.990 | 1.922 | 1.502 | 2.003 |
| V5+V6+V8 | 167.961 | 131.217 | 131.217 | 131.217 | 120.218 | 131.217 | 167.961 | 131.217 | 131.217 | 131.217 |
| (T6+G67+T7)/G78 | 3.098 | 2.805 | 4.199 | 2.359 | 2.502 | 2.430 | 2.925 | 2.517 | 2.448 | 2.618 |
| (G89+T9)/(G67+G78) | 3.253 | 3.055 | 3.252 | 2.045 | 2.028 | 2.001 | 2.072 | 2.001 | 2.280 | 2.001 |
| (T1+G23+G34)/T2 | 5.165 | 6.665 | 4.567 | 6.331 | 6.264 | 8.547 | 6.912 | 6.623 | 4.201 | 6.781 |
| TTL/(T1+T2+T3) | 5.116 | 5.573 | 6.398 | 5.706 | 5.281 | 5.820 | 5.610 | 5.275 | 5.961 | 5.387 |
| T8/(T3+G34) | 1.870 | 2.288 | 3.502 | 1.665 | 2.159 | 1.735 | 2.309 | 1.002 | 1.333 | 1.951 |
| BFL/(T7+G78) | 1.084 | 0.866 | 1.997 | 1.048 | 1.052 | 1.128 | 0.793 | 0.838 | 0.889 | 0.935 |
| AAG/(G45+G56) | 4.906 | 4.237 | 3.603 | 5.598 | 4.875 | 6.199 | 4.856 | 5.065 | 5.915 | 4.737 |
| (G12+G56+G78)/T9 | 1.568 | 1.014 | 0.785 | 1.796 | 2.299 | 0.902 | 2.175 | 2.299 | 2.299 | 2.299 |
| TL/ImgH | 1.711 | 1.301 | 1.176 | 1.203 | 1.189 | 1.195 | 1.305 | 1.267 | 1.329 | 1.275 |
| |V7-V9| | 35.614 | 35.614 | 35.614 | 35.614 | 35.614 | 35.614 | 35.614 | 35.614 | 35.614 | 32.458 |
| (T3+T4)/T7 | 1.717 | 1.473 | 2.299 | 2.009 | 1.927 | 1.717 | 1.241 | 1.241 | 2.280 | 1.391 |
| AAG/(G23+G34+G45) | 3.806 | 3.987 | 2.998 | 3.866 | 3.714 | 2.903 | 3.688 | 4.242 | 4.580 | 4.034 |
| (T1+T2+T3)/T9 | 3.011 | 2.138 | 2.134 | 3.943 | 6.007 | 2.293 | 4.948 | 4.491 | 4.347 | 4.815 |
| V3+V5+V7 | 95.603 | 94.473 | 58.859 | 58.859 | 59.989 | 58.859 | 95.603 | 58.859 | 58.859 | 62.015 |

FIG. 47

OPTICAL IMAGING LENS

CROSS-REFERENCE TO RELATED APPLICATION

This application claims the priority benefit of Chinese application serial no. 202011509246.3, filed on Dec. 18, 2020. The entirety of the above-mentioned patent application is hereby incorporated by reference herein and made a part of this specification.

BACKGROUND OF THE INVENTION

Field of the Invention

The invention relates to an optical element, and in particular to an optical imaging lens.

Description of Related Art

In recent years, optical imaging lenses have continued to evolve. In addition to requiring the lenses to be compact, it is also increasingly important to improve the imaging qualities of the lenses such as aberration and chromatism. However, increasing the number of optical lens elements in response to demand increases the distance between the object-side surface of the first lens element farthest from the image plane and the image plane on the optical axis, which is not conducive to the thinning of mobile phones and digital cameras.

Therefore, providing an optical imaging lens that is lightweight and compact and has good imaging quality has always been a development object of optical lens design. In addition, a small f-number may increase the amount of light, and a large image height may suitably increase the pixel size and is conducive to night shooting, which have also gradually become a market trend. Designing an optical imaging lens with a large image height and a small f-number under the premise of pursuing a lightweight and compact lens is also the focus of research and development.

SUMMARY OF THE INVENTION

The invention provides an optical imaging lens with short lens system length, large image height, small f-number, and good imaging quality.

According to an embodiment of the invention, an optical imaging lens is provided. The optical imaging lens includes a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The second lens element has negative refracting power. The fifth lens element has negative refracting power and a periphery region of the object-side surface of the fifth lens element is concave. An optical axis region of the object-side surface of the sixth lens element is concave. The seventh lens element has negative refracting power, wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

According to another embodiment of the invention, an optical imaging lens is provided. The optical imaging lens includes a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The second lens element has negative refracting power. A periphery region of the object-side surface of the fifth lens element is concave. The sixth lens element has positive refracting power and a periphery region of the object-side surface of the sixth lens element is concave. An optical axis region of the object-side surface of the seventh lens element is convex, wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

According to yet another embodiment of the invention, an optical imaging lens is provided. The optical imaging lens includes a first lens element, a second lens element, a third lens element, a fourth lens element, a fifth lens element, a sixth lens element, a seventh lens element, an eighth lens element, and a ninth lens element sequentially arranged along an optical axis from an object side to an image side. Each of the first lens element to the ninth lens element includes an object-side surface facing the object side and allowing imaging rays to pass through and an image-side surface facing the image side and allowing the imaging rays to pass through. The second lens element has negative refracting power. A periphery region of the image-side surface of the fourth lens element is concave. The seventh lens element has negative refracting power. An optical axis region of an image-side surface of the ninth lens element is concave, wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

Based on the above, the optical imaging lens of an embodiment of the invention has the following beneficial effects: in the optical imaging lens of an embodiment of the invention, via the configuration the lens elements and the refracting powers thereof, the design of the surface shapes of the lens elements, and making the optical imaging lens satisfy the above condition, the optical imaging lens of an embodiment of the invention may have a short system length, a large image height, a small f-number, and good imaging quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic of the optical imaging lens of the first embodiment of the invention.

FIG. 7A to FIG. 7D are diagrams of the longitudinal spherical aberration and various aberrations of the optical imaging lens of the first embodiment.

FIG. 8 shows detailed optical data of the optical imaging lens of the first embodiment of the invention.

FIG. 9 shows aspheric surface parameters of the optical imaging lens of the first embodiment of the invention.

FIG. 10 is a schematic of the optical imaging lens of the second embodiment of the invention.

FIG. 11A to FIG. 11D are diagrams of the longitudinal spherical aberration and various aberrations of the optical imaging lens of the second embodiment.

FIG. 12 shows detailed optical data of the optical imaging lens of the second embodiment of the invention.

FIG. 13 shows aspheric surface parameters of the optical imaging lens of the second embodiment of the invention.

FIG. 16 shows detailed optical data of the optical imaging lens of the third embodiment of the invention.

FIG. 17 shows aspheric surface parameters of the optical imaging lens of the third embodiment of the invention.

FIG. 18 is a schematic of the optical imaging lens of the fourth embodiment of the invention.

FIG. 19A to FIG. 19D are diagrams of the longitudinal spherical aberration and various aberrations of the optical imaging lens of the fourth embodiment.

FIG. 20 shows detailed optical data of the optical imaging lens of the fourth embodiment of the invention.

FIG. 21 shows aspheric surface parameters of the optical imaging lens of the fourth embodiment of the invention.

FIG. 22 is a schematic of the optical imaging lens of the fifth embodiment of the invention.

FIG. 23A to FIG. 23D are diagrams of the longitudinal spherical aberration and various aberrations of the optical imaging lens of the fifth embodiment.

FIG. 24 shows detailed optical data of the optical imaging lens of the fifth embodiment of the invention.

FIG. 25 shows aspheric surface parameters of the optical imaging lens of the fifth embodiment of the invention.

FIG. 26 is a schematic of the optical imaging lens of the sixth embodiment of the invention.

FIG. 27A to FIG. 27D are diagrams of the longitudinal spherical aberration and various aberrations of the optical imaging lens of the sixth embodiment.

FIG. 28 shows detailed optical data of the optical imaging lens of the sixth embodiment of the invention.

FIG. 29 shows aspheric surface parameters of the optical imaging lens of the sixth embodiment of the invention.

FIG. 30 is a schematic of the optical imaging lens of the seventh embodiment of the invention.

FIG. 31A to FIG. 31D are diagrams of the longitudinal spherical aberration and various aberrations of the optical imaging lens of the seventh embodiment.

FIG. 32 shows detailed optical data of the optical imaging lens of the seventh embodiment of the invention.

FIG. 33 shows aspheric surface parameters of the optical imaging lens of the seventh embodiment of the invention.

FIG. 34 is a schematic of the optical imaging lens of the eighth embodiment of the invention.

FIG. 35A to FIG. 35D are diagrams of the longitudinal spherical aberration and various aberrations of the optical imaging lens of the eighth embodiment.

FIG. 36 shows detailed optical data of the optical imaging lens of the eighth embodiment of the invention.

FIG. 37 shows aspheric surface parameters of the optical imaging lens of the eighth embodiment of the invention.

FIG. 38 is a schematic of the optical imaging lens of the ninth embodiment of the invention.

FIG. 39A to FIG. 39D are diagrams of the longitudinal spherical aberration and various aberrations of the optical imaging lens of the ninth embodiment.

FIG. 40 shows detailed optical data of the optical imaging lens of the ninth embodiment of the invention.

FIG. 41 shows aspheric surface parameters of the optical imaging lens of the ninth embodiment of the invention.

FIG. 42 is a schematic of the optical imaging lens of the tenth embodiment of the invention.

FIG. 43A to FIG. 43D are diagrams of the longitudinal spherical aberration and various aberrations of the optical imaging lens of the tenth embodiment.

FIG. 44 shows detailed optical data of the optical imaging lens of the tenth embodiment of the invention.

FIG. 45 shows aspheric surface parameters of the optical imaging lens of the tenth embodiment of the invention.

FIG. 46 and FIG. 47 show the numeric values of various important parameters and relationship formulas thereof of the optical imaging lenses of the first to tenth embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
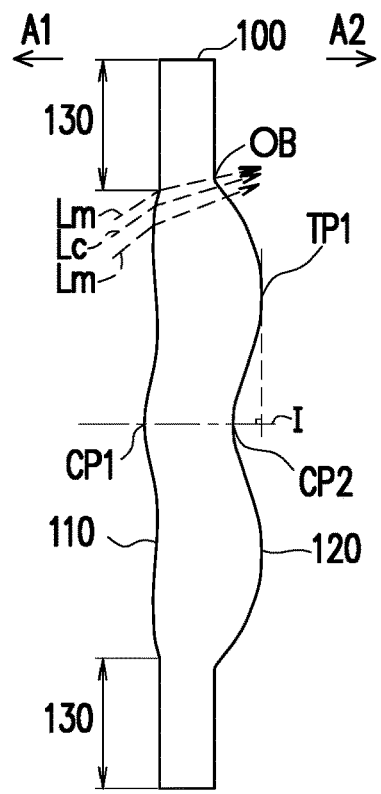
FIG. 1 is a schematic illustrating the surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
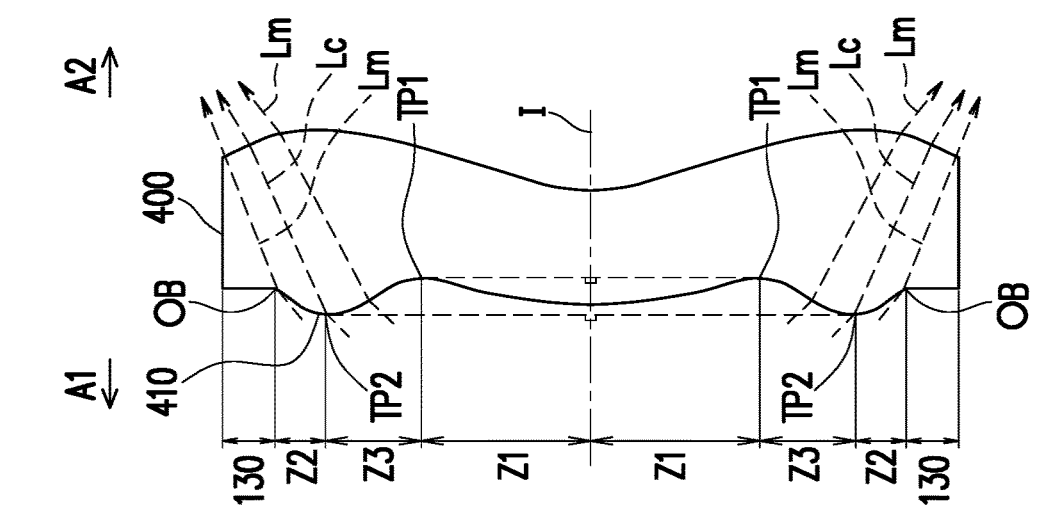
FIG. 4 is a schematic illustrating the surface structure of the lens element of Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
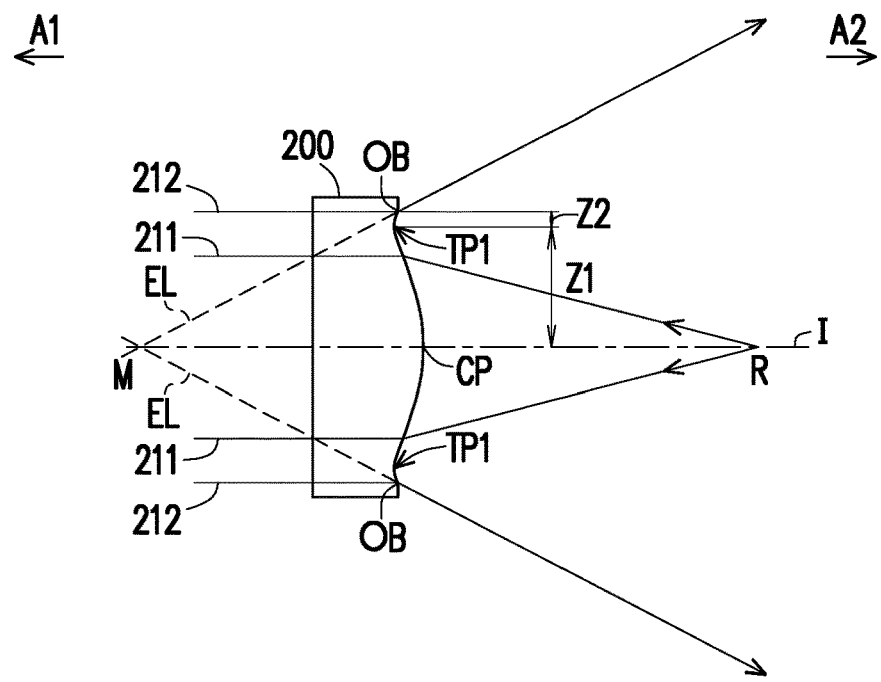
FIG. 2 is a schematic illustrating the surface convex and concave structure of a lens element and the focus of light rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
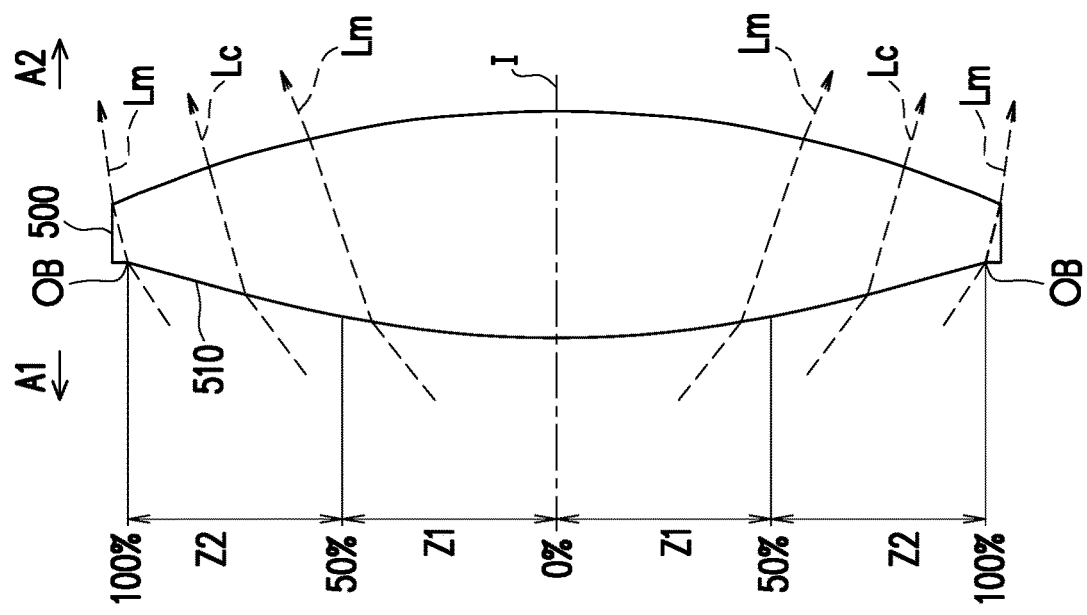
FIG. 5 is a schematic illustrating the surface structure of the lens element of Example 3.
Figure 3:
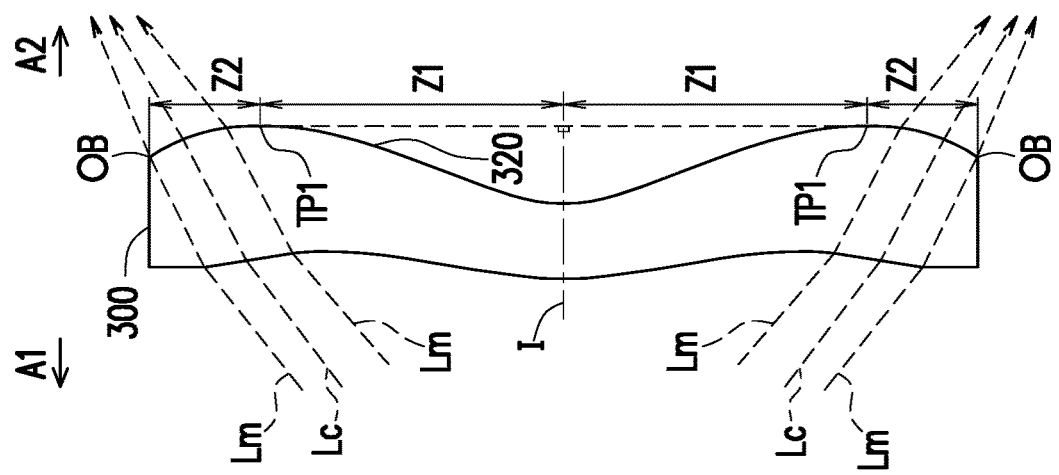
FIG. 3 is a schematic illustrating the surface structure of the lens element of Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a diagram of the optical imaging lens of the first embodiment of the invention, and FIG. 7A to FIG. 7D are diagrams of the longitudinal spherical aberration and various aberrations of the optical imaging lens of the first embodiment. Referring to FIG. 6 first, an optical imaging lens 10 of the first embodiment of the invention sequentially includes an aperture stop 0, a first lens element 1, a second lens element 2, a third lens element 3, a fourth lens element 4, a fifth lens element 5, a sixth lens element 6, a seventh lens element 7, an eighth lens element 8, a ninth lens element 9, and a filter 11 along the optical axis I of the optical imaging lens 10 from the object side A1 to the image side A2. When light rays emitted by an object to be photographed enter the optical imaging lens 10 and sequentially pass through the aperture stop 0, the first lens 1 element, the second lens 2 element, the third lens 3 element, the fourth lens element 4, the fifth lens element 5, the sixth lens element 6, the seventh lens element 7, the eighth lens element 8, the ninth lens element 9, and the filter 11, an image is formed on an image plane 99. The filter 11 is, for example, an infrared cut-off filter, which may allow light with a suitable wavelength (for example, infrared or visible light) to pass through and filter out the infrared waveband to be filtered. The filter 11 is disposed between the ninth lens element 9 and the image plane 99. It should be added that, the object side A1 is a side facing the object to be photographed and the image side A2 is a side facing the image plane 99.

In the present embodiment, the first lens element 1, the second lens element 2, the third lens element 3, the fourth lens element 4, the fifth lens element 5, the sixth lens element 6, the seventh lens element 7, the eighth lens element 8, the ninth lens element 9, and the filter 11 each have an object-side surface 15, 25, 35, 45, 55, 65, 75, 85, 95, and 105 facing the object side A1 and allowing imaging rays to pass through and an image-side surface 16, 26, 36, 46, 56, 66, 76, 86, 96, and 106 facing the image side A2 and allowing imaging rays to pass through. In the present embodiment, the aperture stop 0 is disposed between the object side A1 and the first lens element 1.

The first lens element 1 has positive refracting power. An optical axis region 151 of the object-side surface 15 of the first lens element 1 is convex, and a periphery region 152 thereof is convex. An optical axis region 161 of the image-side surface 16 of the first lens element 1 is concave, and a periphery region 162 thereof is concave. In the present embodiment, the object-side surface 15 and the image-side surface 16 of the first lens element 1 are both aspheric surfaces.

The second lens element 2 has negative refracting power. An optical axis region 251 of the object-side surface 25 of the second lens element 2 is convex, and a periphery region 252 thereof is convex. An optical axis region 261 of the image-side surface 26 of the second lens element 2 is concave, and a periphery region 262 thereof is concave. In the present embodiment, the object-side surface 25 and the image-side surface 26 of the second lens element 2 are both aspheric surfaces.

The third lens element 3 has negative refracting power. An optical axis region 351 of the object-side surface 35 of the third lens element 3 is convex, and a periphery region 352 thereof is concave. An optical axis region 361 of the image-side surface 36 of the third lens element 3 is concave, and a periphery region 362 thereof is convex. In the present embodiment, the object-side surface 35 and the image-side surface 36 of the third lens element 3 are both aspheric surfaces.

The fourth lens element 4 has positive refracting power. An optical axis region 451 of the object-side surface 45 of the fourth lens element 4 is convex, and a periphery region 452 thereof is convex. An optical axis region 461 of the image-side surface 46 of the fourth lens element 4 is convex, and a periphery region 462 thereof is concave. In the present embodiment, the object-side surface 45 and the image-side surface 46 of the fourth lens element 4 are both aspheric surfaces.

The fifth lens element 5 has negative refracting power. An optical axis region 551 of the object-side surface 55 of the fifth lens element 5 is concave, and a periphery region 552 thereof is concave. An optical axis region 561 of the image-side surface 56 of the fifth lens element 5 is convex, and a periphery region 562 thereof is convex. In the present embodiment, the object-side surface 55 and the image-side surface 56 of the fifth lens element 5 are both aspheric surfaces.

The sixth lens element 6 has positive refracting power. An optical axis region 651 of the object-side surface 65 of the sixth lens element 6 is concave, and a periphery region 652 thereof is concave. An optical axis region 661 of the image-side surface 66 of the sixth lens element 6 is convex, and a periphery region 662 thereof is convex. In the present embodiment, the object-side surface 65 and the image-side surface 66 of the sixth lens element 6 are both aspheric surfaces.

The seventh lens element 7 has negative refracting power. An optical axis region 751 of the object-side surface 75 of the seventh lens element 7 is convex, and a periphery region 752 thereof is concave. An optical axis region 761 of the image-side surface 76 of the seventh lens element 7 is concave, and a periphery region 762 thereof is convex. In the present embodiment, the object-side surface 75 and the image-side surface 76 of the seventh lens element 7 are both aspheric surfaces.

The eighth lens element 8 has positive refracting power. An optical axis region 851 of the object-side surface 85 of the eighth lens element 8 is convex, and a periphery region 852 thereof is concave. An optical axis region 861 of the image-side surface 86 of the eighth lens element 8 is concave, and a periphery region 862 thereof is convex. In the present embodiment, the object-side surface 85 and the image-side surface 86 of the eighth lens element 8 are both aspheric surfaces.

The ninth lens element 9 has negative refracting power. An optical axis region 951 of the object-side surface 95 of the ninth lens element 9 is concave, and a periphery region 952 thereof is concave. An optical axis region 961 of the image-side surface 96 of the ninth lens element 9 is concave, and a periphery region 962 thereof is convex. In the present embodiment, the object-side surface 95 and the image-side surface 96 of the ninth lens element 9 are both aspheric surfaces.

Other detailed optical data of the first embodiment is shown in FIG. 8, and the optical imaging lens 10 of the first embodiment has an effective focal length (EFL) of 6.466 millimeters (mm), a half field of view (HFOV) of 32.912°, a system length of 8.394 mm, an f-number (Fno) of 1.600, and an image height of 4.320 mm, wherein the system length refers to the distance from the object-side surface 15 of the first lens element 1 to the image plane 99 on the optical axis I.

In addition, in the present embodiment, a total of 18 surfaces of the first lens element 1, the second lens element 2, the third lens element 3, the fourth lens element 4, the fifth lens element 5, the sixth lens element 6, the seventh lens element 7, the eighth lens element 8, and the ninth lens element 9, namely the object-side surfaces 15, 25, 35, 45, 55, 65, 75, 85, 95 and the image-side surfaces 16, 26, 36, 46, 56, 66, 76, 86, 96 are all aspheric surfaces, and these aspheric surfaces are defined by the following equation:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

Y: perpendicular distance between a point on the aspheric surface curve and the optical axis;
Z: aspheric surface depth, i.e., perpendicular distance between the point on the aspheric surface that is spaced by the distance Y from the optical axis and a tangent plane tangent to the vertex of the aspheric surface on the optical axis;
R: radius of curvature of the lens element surface;
K: conic constant;
$a_{2i}$: 2i-th aspheric surface coefficient.

Each of the aspheric coefficients of the object-side surface 15 of the first lens element 1 to the image-side surface 96 of the ninth lens element 9 in general formula (1) is as shown in FIG. 9. In particular, column number 15 in FIG. 9 represents the aspheric coefficient of the object-side surface 15 of the first lens element 1, and the other column fields are defined in a similar manner. In the present embodiment, the 2nd aspheric coefficients $a_2$ of the object-side surface 15 of the first lens element 1 to the image-side surface 96 of the ninth lens element 9 are all zero. Moreover, the relationship between each of the important parameters in the optical imaging lens 10 of the first embodiment is as shown in FIG. 46 and FIG. 47, wherein, EFL is an effective focal length of the optical imaging lens 10;
Fno is an f-number of the optical imaging lens 10;
ImgH is an image height of the optical imaging lens 10;
T1 is a thickness of the first lens element 1 on the optical axis I, in millimeters (mm);
T2 is a thickness of the second lens element 2 on the optical axis I, in millimeters (mm);
T3 is a thickness of the third lens element 3 on the optical axis I, in millimeters (mm);
T4 is a thickness of the fourth lens element 4 on the optical axis I, in millimeters (mm);
T5 is a thickness of the fifth lens element 5 on the optical axis I, in millimeters (mm);
T6 is a thickness of the sixth lens element 6 on the optical axis I, in millimeters (mm);
T7 is a thickness of the seventh lens element 7 on the optical axis I, in millimeters (mm);
T8 is a thickness of the eighth lens element 8 on the optical axis I, in millimeters (mm);
T9 is a thickness of the ninth lens element 9 on the optical axis I, in millimeters (mm);
G12 is a distance from the image-side surface 16 of the first lens element 1 to the object-side surface 25 of the second lens element 2 on the optical axis I, that is, an air gap between the first lens element 1 and the second lens element 2 on the optical axis I, in millimeters (mm);
G23 is a distance from the image-side surface 26 of the second lens element 2 to the object-side surface 35 of the third lens element 3 on the optical axis I, that is, an air gap between the second lens element 2 and the third lens element 3 on the optical axis I, in millimeters (mm);
G34 is a distance from the image-side surface 36 of the third lens element 3 to the object-side surface 45 of the fourth lens element 4 on the optical axis I, that is, an air gap between the third lens element 3 and the fourth lens element 4 on the optical axis I, in millimeters (mm);
G45 is a distance from the image-side surface 46 of the fourth lens element 4 to the object-side surface 55 of the fifth lens element 5 on the optical axis I, that is, an air gap between the fourth lens element 4 and the fifth lens element 5 on the optical axis I, in millimeters (mm);
G56 is a distance from the image-side surface 56 of the fifth lens element 5 to the object-side surface 65 of the sixth lens element 6 on the optical axis I, that is, an air gap between the fifth lens element 5 and the sixth lens element 6 on the optical axis I, in millimeters (mm);

G67 is a distance from the image-side surface 66 of the sixth lens element 6 to the object-side surface 75 of the seventh lens element 7 on the optical axis I, that is, an air gap between the sixth lens element 6 and the seventh lens element 7 on the optical axis I, in millimeters (mm);

G78 is a distance from the image-side surface 76 of the seventh lens element 7 to the object-side surface 85 of the eighth lens element 8 on the optical axis I, that is, an air gap between the seventh lens element 7 and the eighth lens element 8 on the optical axis I, in millimeters (mm);

G89 is a distance from the image-side surface 86 of the eighth lens element 8 to the object-side surface 95 of the ninth lens element 9 on the optical axis I, that is, an air gap between the eighth lens element 8 and the ninth lens element 9 on the optical axis I, in millimeters (mm);

G9F is an air gap between the ninth lens element 9 and the filter 11 on the optical axis I, in millimeters (mm);

TF is a thickness of the filter 11 on the optical axis I, in millimeters (mm);

GFP is an air gap between the filter 11 and the image plane 99 on the optical axis I, in millimeters (mm);

V1 is an Abbe number of the first lens element 1;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7;
V8 is an Abbe number of the eighth lens element 8;
V9 is an Abbe number of the ninth lens element 9;

ALT is a sum of nine thicknesses of the first lens element 1 to the ninth lens element 9 on the optical axis I, that is, a sum of T1, T2, T3, T4, T5, T6, T7, T8, and T9, in millimeters (mm);

AAG is a sum of eight air gaps of the first lens element 1 to the ninth lens element 9 on the optical axis I, that is, a sum of G12, G23, G34, G45, G56, G67, G78, and G89, in millimeters (mm);

TTL is a distance from the object-side surface 15 of the first lens element 1 to the image plane 99 on the optical axis I, in millimeters (mm);

TL is a distance from the object-side surface 15 of the first lens element 1 to the image-side surface 96 of the ninth lens element 9 on the optical axis I, in millimeters (mm);

BFL is a distance from the image-side surface 96 of the ninth lens element 9 to the image plane 99 on the optical axis I, in millimeters (mm).

Referring further to FIG. 7A to FIG. 7D, FIG. 7A illustrates the longitudinal spherical aberration of the first embodiment, FIG. 7B and FIG. 7C respectively illustrate the field curvature aberration in the sagittal direction and the field curvature aberration in the tangential direction on the image plane 99 when the wavelengths of the first embodiment are 470 nm, 555 nm, and 650 nm, and FIG. 7D illustrates the distortion aberration on the image plane 99 when the wavelengths of the first embodiment are 470 nm, 555 nm, and 650 nm. In the longitudinal spherical aberration figure of the first embodiment in FIG. 7A, it may be seen from the deflection amplitude of each curve representing the wavelength that the imaging point deviation of off-axis rays at different heights is controlled within the range of ±27 microns (μm). Therefore, the first embodiment does significantly improve the spherical aberration of the same wavelength. In addition, the distances between the three representative wavelengths are also quite close to each other, indicating the imaging positions of light rays with different wavelengths are relatively concentrated, and therefore the chromatic aberration is also significantly alleviated.

In the two field curvature aberration figures of FIG. 7B and FIG. 7C, the field curvature aberrations of three representative wavelengths in the entire field of view are within ±70 microns, indicating that the optical system of the first embodiment may effectively eliminate aberrations. The distortion aberration figure in FIG. 7D shows that the distortion aberration of the first embodiment is maintained within the range of ±3%, indicating that the distortion aberration of the first embodiment meets the imaging quality requirements of the optical system. Accordingly, compared with an existing optical imaging lens, the first embodiment may still provide good imaging quality under the condition that the system length is 8.394 mm, the f-number is 1.600, and the image height is 4.320 mm.

FIG. 10 is a schematic of the optical imaging lens of the second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the second embodiment, the periphery region 352 of the object-side surface 35 of the third lens element 3 is convex, and the periphery region 362 of the image-side surface 36 thereof is concave. The optical axis region 461 of the image-side surface 46 of the fourth lens element 4 is concave. The optical axis region 551 of the object-side surface 55 of the fifth lens element 5 is convex, and the optical axis region 561 of the image-side surface 56 thereof is concave. It should be mentioned here that, to clearly show the figure, in FIG. 10, the reference numerals of the optical axis region and the periphery region similar to those of the first embodiment are omitted.

The detailed optical data of the optical imaging lens 10 of the second embodiment is shown in FIG. 12, and the optical imaging lens 10 of the second embodiment has an overall effective focal length of 6.302 mm, a half field of view (HFOV) of 38.682°, an f-number (Fno) of 1.600, a system length of 8.188 mm, and an image height of 5.800 mm.

FIG. 13 shows each of the aspheric coefficients of the object-side surface 15 of the first lens element 1 to the image-side surface 96 of the ninth lens element 9 of the second embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the second embodiment is as shown in FIG. 46 and FIG. 47.

FIG. 11A illustrates the longitudinal spherical aberration of the second embodiment, in which the imaging point deviation of off-axis rays at different heights is controlled within the range of ±16 microns. In the two field curvature aberration figures of FIG. 11B and FIG. 11C, the field curvature aberrations of three representative wavelengths in the entire field of view are within ±25 microns. The distortion aberration figure of FIG. 11D shows that the distortion aberration of the second embodiment is maintained within the range of ±16%. Accordingly, it is explained that the longitudinal spherical aberration, the field curvature aberration in the sagittal direction, and the field curvature aberration in the tangential direction of the second embodiment are better than those of the first embodiment, and good imaging quality is provided. In addition, the system length of the second embodiment is less than the system length of the first embodiment, and the image height of the second embodiment is greater than the image height of the first embodiment.

Figure 14:
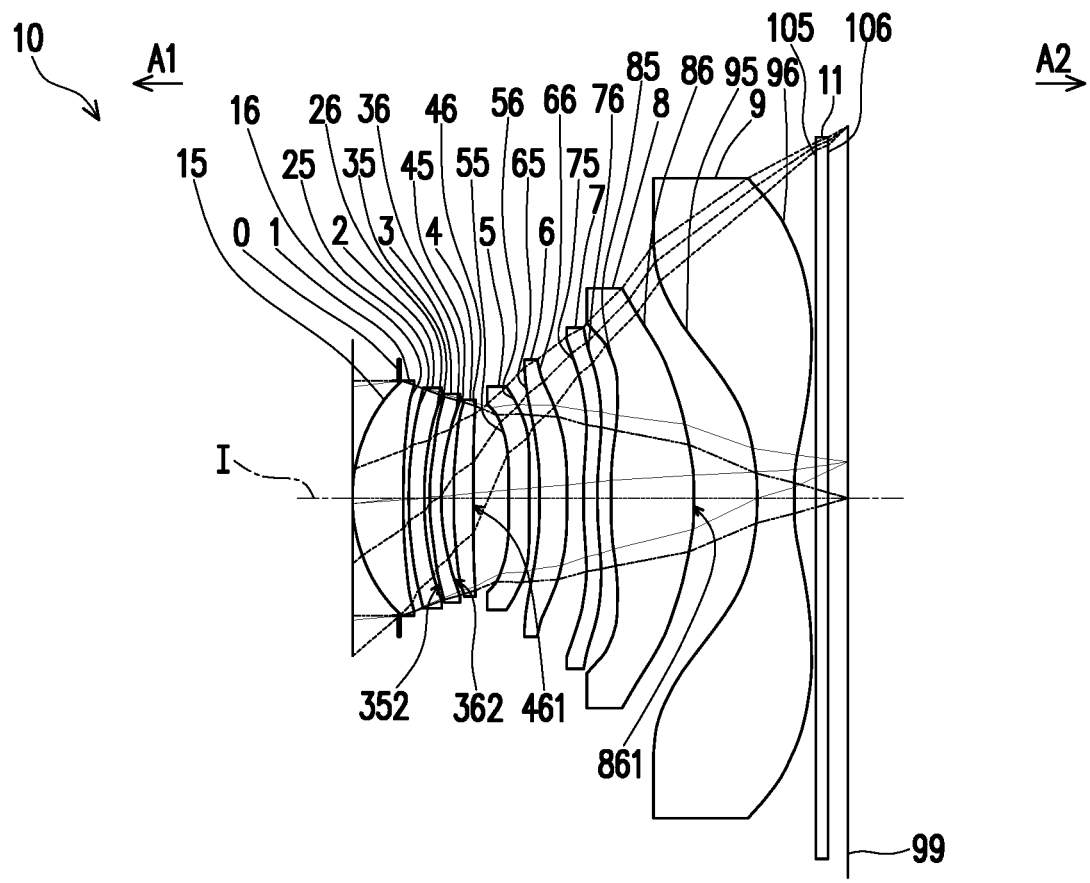
FIG. 14 is a schematic of the optical imaging lens of the third embodiment of the invention.

FIG. 14 is a schematic of the optical imaging lens of the third embodiment of the invention, and FIG. 15A to FIG. 15D are diagrams of the longitudinal spherical aberration and various aberrations of the optical imaging lens of the third embodiment. Referring first to FIG. 14, the third embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the third embodiment, the periphery region 352 of the object-side surface 35 of the third lens element 3 is convex, and the periphery region 362 of the image-side surface 36 thereof is concave. The optical axis region 461 of the image-side surface 46 of the fourth lens element 4 is concave. The optical axis region 861 of the image-side surface 86 of the eighth lens element 8 is convex. It should be mentioned here that, to clearly show the figure, in FIG. 14, the reference numerals of the optical axis region and the periphery region similar to those in the first embodiment are omitted.

The detailed optical data of the optical imaging lens 10 of the third embodiment is shown in FIG. 16, and the optical imaging lens 10 of the third embodiment has an effective focal length of 6.783 mm, a half field of view (HFOV) of 41.490°, an f-number (Fno) of 1.600, a system length of 8.843 mm, and an image height of 6.700 mm.

FIG. 17 shows each of the aspheric coefficients of the object-side surface 15 of the first lens element 1 to the image-side surface 96 of the ninth lens element 9 of the third embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the third embodiment is as shown in FIG. 46 and FIG. 47.

Figures 15A, 15B, 15C, 15D:
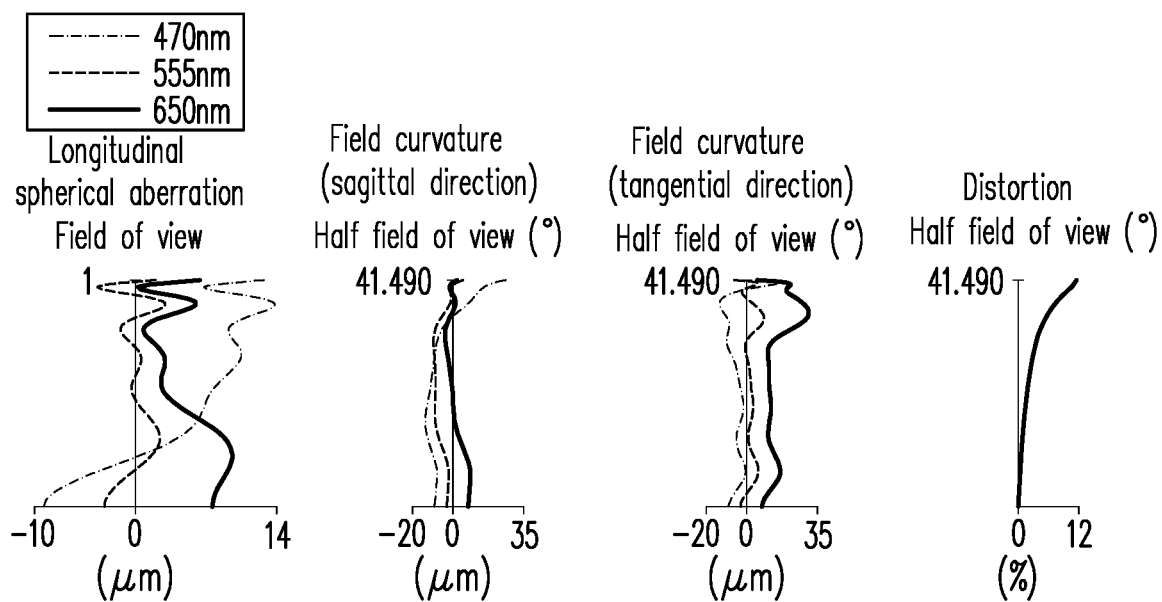
FIG. 15A to FIG. 15D are diagrams of the longitudinal spherical aberration and various aberrations of the optical imaging lens of the third embodiment.

FIG. 15A illustrates the longitudinal spherical aberration of the third embodiment, in which the imaging point deviation of off-axis rays at different heights is controlled within the range of ±14 microns. In the two field curvature aberration figures of FIG. 15B and FIG. 15C, the field curvature aberrations of three representative wavelengths in the entire field of view are within ±32 microns. The distortion aberration figure of FIG. 15D shows that the distortion aberration of the third embodiment is maintained within the range of ±12%. Accordingly, it is explained that the longitudinal spherical aberration, the field curvature aberration in the sagittal direction, and the field curvature aberration in the tangential direction of the third embodiment are better than those of the first embodiment, and good imaging quality is provided. In addition, the image height of the third embodiment is greater than the image height of the first embodiment.

FIG. 18 is a schematic of the optical imaging lens of the fourth embodiment of the invention, and FIG. 19A to FIG. 19D are diagrams of the longitudinal spherical aberration and various aberrations of the optical imaging lens of the fourth embodiment. Referring first to FIG. 18, the fourth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the fourth embodiment, the periphery region 352 of the object-side surface 35 of the third lens element 3 is convex, and the periphery region 362 of the image-side surface 36 thereof is concave. The fourth lens element 4 has negative refracting power, and the optical axis region 461 of the image-side surface 46 is concave. The optical axis region 551 of the object-side surface 55 of the fifth lens element 5 is convex, and the optical axis region 561 of the image-side surface 56 thereof is concave. The periphery region 652 of the object-side surface 65 of the sixth lens element 6 is convex. The optical axis region 861 of the image-side surface 86 of the eighth lens element 8 is convex. The periphery region 952 of the object-side surface 95 of the ninth lens element 9 is convex. It should be mentioned here that, to clearly show the figure, in FIG. 18, the reference numerals of the optical axis region and the periphery region similar to those in the first embodiment are omitted.

The detailed optical data of the optical imaging lens 10 of the fourth embodiment is shown in FIG. 20, and the optical imaging lens 10 of the fourth embodiment has an effective focal length of 7.001 mm, a half field of view (HFOV) of 40.252°, an f-number (Fno) of 1.600, a system length of 8.945 mm, and an image height of 6.700 mm.

FIG. 21 shows each of the aspheric coefficients of the object-side surface 15 of the first lens element 1 to the image-side surface 96 of the ninth lens element 9 of the fourth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the fourth embodiment is as shown in FIG. 46 and FIG. 47.

FIG. 19A illustrates the longitudinal spherical aberration of the fourth embodiment, in which the imaging point deviation of off-axis rays at different heights is controlled within the range of ±30 microns. In the two field curvature aberration figures of FIG. 19B and FIG. 19C, the field curvature aberrations of three representative wavelengths in the entire field of view are within ±25 microns. The distortion aberration figure of FIG. 19 shows that the distortion aberration of the fourth embodiment is maintained within the range of ±15%. Accordingly, it is explained that the field curvature aberration in the sagittal direction and the field curvature aberration in the tangential direction of the fourth embodiment are better than those of the first embodiment, and good imaging quality is provided. In addition, the image height of the fourth embodiment is greater than the image height of the first embodiment.

FIG. 22 is a schematic of the optical imaging lens of the fifth embodiment of the invention, and FIG. 23A to FIG. 23D are diagrams of the longitudinal spherical aberration and various aberrations of the optical imaging lens of the fifth embodiment. Referring first to FIG. 22, the fifth embodiment of the optical imaging lens 10 of the invention is substantially similar to the first embodiment, and the difference between the two is as follows: the optical data, the aspheric coefficients, and other parameters of the lens elements 1, 2, 3, 4, 5, 6, 7, 8, and 9 are slightly different.

Moreover, in the fifth embodiment, the periphery region 352 of the object-side surface 35 of the third lens element 3 is convex, and the periphery region 362 of the image-side surface 36 thereof is concave. The optical axis region 461 of the image-side surface 46 of the fourth lens element 4 is concave. The optical axis region 861 of the image-side surface 86 of the eighth lens element 8 is convex. It should be mentioned here that, to clearly show the figure, in FIG. 22, the reference numerals of the optical axis region and the periphery region similar to those in the first embodiment are omitted.

The detailed optical data of the optical imaging lens 10 of the fifth embodiment is shown in FIG. 24, and the optical imaging lens 10 of the fifth embodiment has an effective focal length of 6.865 mm, a half field of view (HFOV) of 40.676°, an f-number (Fno) of 1.600, a system length of 8.819 mm, and an image height of 6.700 mm.

FIG. 25 shows each of the aspheric coefficients of the object-side surface 15 of the first lens element 1 to the image-side surface 96 of the ninth lens element 9 of the fifth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the fifth embodiment is as shown in FIG. 46 and FIG. 47.

FIG. 23A illustrates the longitudinal spherical aberration of the fifth embodiment, in which the imaging point deviation of off-axis rays at different heights is controlled within the range of ±14 microns. In the two field curvature aberration figures of FIG. 23B and FIG. 23C, the field curvature aberrations of three representative wavelengths in the entire field of view are within ±30 microns. The distortion aberration figure of FIG. 23 shows that the distortion aberration of the fifth embodiment is maintained within the range of ±14%. Accordingly, it is explained that the longitudinal spherical aberration, the field curvature aberration in the sagittal direction, and the field curvature aberration in the tangential direction of the fifth embodiment are better than those of the first embodiment, and good imaging quality is provided. In addition, the image height of the fifth embodiment is greater than the image height of the first embodiment.

FIG. 26 is a schematic of the optical imaging lens of the sixth embodiment of the invention, and FIG. 27A to FIG. 27D are diagrams of the longitudinal spherical aberration and various aberrations of the optical imaging lens of the sixth embodiment. Referring first to FIG. 26, the sixth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the sixth embodiment, the periphery region 352 of the object-side surface 35 of the third lens element 3 is convex, and the periphery region 362 of the image-side surface 36 thereof is concave. The optical axis region 451 of the object-side surface 45 of the fourth lens element 4 is concave. The periphery region 652 of the object-side surface 65 of the sixth lens element 6 is convex. The optical axis region 861 of the image-side surface 86 of the eighth lens element 8 is convex. It should be mentioned here that, to clearly show the figure, in FIG. 26, the reference numerals of the optical axis region and the periphery region similar to those of the first embodiment are omitted.

The detailed optical data of the optical imaging lens 10 of the sixth embodiment is shown in FIG. 28, and the optical imaging lens 10 of the sixth embodiment has an effective focal length of 7.046 mm, a half field of view (HFOV) of 39.672°, an f-number (Fno) of 1.600, a system length of 8.906 mm, and an image height of 6.700 mm.

FIG. 29 shows each of the aspheric coefficients of the object-side surface 15 of the first lens element 1 to the image-side surface 96 of the ninth lens element 9 of the sixth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the sixth embodiment is as shown in FIG. 46 and FIG. 47.

FIG. 27A illustrates the longitudinal spherical aberration of the sixth embodiment, in which the imaging point deviation of off-axis rays at different heights is controlled within the range of ±18 microns. In the two field curvature aberration figures of FIG. 27B and FIG. 27C, the focal length variation amounts of three representative wavelengths in the entire field of view are within ±25 microns. The distortion aberration figure of FIG. 27 shows that the distortion aberration of the sixth embodiment is maintained within the range of ±15%. Accordingly, it is explained that the longitudinal spherical aberration, the field curvature aberration in the sagittal direction, and the field curvature aberration in the tangential direction of the sixth embodiment are better than those of the first embodiment, and good imaging quality is provided. In addition, the image height of the sixth embodiment is greater than the image height of the first embodiment.

FIG. 30 is a schematic of the optical imaging lens of the seventh embodiment of the invention, and FIG. 31A to FIG. 31D are diagrams of the longitudinal spherical aberration and various aberrations of the optical imaging lens of the seventh embodiment. Referring first to FIG. 30, the seventh embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the seventh embodiment, the periphery region 352 of the object-side surface 35 of the third lens element 3 is convex, and the periphery region 362 of the image-side surface 36 thereof is concave. The optical axis region 461 of the image-side surface 46 of the fourth lens element 4 is concave. The optical axis region 551 of the object-side surface 55 of the fifth lens element 5 is convex, and the optical axis region 561 of the image-side surface 56 thereof is concave. The optical axis region 861 of the image-side surface 86 of the eighth lens element 8 is convex. The periphery region 952 of the object-side surface 95 of the ninth lens element 9 is convex. It should be mentioned here that, to clearly show the figure, in FIG. 30, the reference numerals of the optical axis region and the periphery region similar to those of the first embodiment are omitted.

The detailed optical data of the optical imaging lens 10 of the seventh embodiment is shown in FIG. 32, and the optical imaging lens 10 of the seventh embodiment has an effective focal length of 6.367 mm, a half field of view (HFOV) of 38.193°, an f-number (Fno) of 1.600, a system length of 8.278 mm, and an image height of 6.700 mm.

FIG. 33 shows each of the aspheric coefficients of the object-side surface 15 of the first lens element 1 to the image-side surface 96 of the ninth lens element 9 of the seventh embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the seventh embodiment is as shown in FIG. 46 and FIG. 47.

FIG. 31A illustrates the longitudinal spherical aberration of the seventh embodiment, in which the imaging point deviation of off-axis rays at different heights is controlled within the range of ±16 microns. In the two field curvature aberration figures of FIG. 31B and FIG. 31C, the focal length variation amounts of three representative wavelengths in the entire field of view are within ±14 microns. The distortion aberration figure of FIG. 31 shows that the distortion aberration of the seventh embodiment is maintained within the range of ±16%. Accordingly, it is explained that the longitudinal spherical aberration, the field curvature aberration in the sagittal direction, and the field curvature aberration in the tangential direction of the seventh embodiment are better than those of the first embodiment, and good imaging quality is provided. In addition, the system length of the seventh embodiment is less than the system length of the first embodiment. The image height of the seventh embodiment is greater than the image height of the first embodiment.

FIG. 34 is a schematic of the optical imaging lens of the eighth embodiment of the invention, and FIG. 35A to FIG. 35D are diagrams of the longitudinal spherical aberration and various aberrations of the optical imaging lens of the eighth embodiment. Referring first to FIG. 34, the eighth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the eighth embodiment, the periphery region 352 of the object-side surface 35 of the third lens element 3 is convex, and the periphery region 362 of the image-side surface 36 thereof is concave. The optical axis region 561 of the image-side surface 56 of the fifth lens element 5 is concave. The optical axis region 861 of the image-side surface 86 of the eighth lens element 8 is convex. It should be mentioned here that, to clearly show the figure, in FIG. 34, the reference numerals of the optical axis region and the periphery region similar to those of the first embodiment are omitted.

The detailed optical data of the optical imaging lens 10 of the eighth embodiment is shown in FIG. 36, and the optical imaging lens 10 of the eighth embodiment has an effective focal length of 6.491 mm, a half field of view (HFOV) of 38.123°, an f-number (Fno) of 1.600, a system length of 8.193 mm, and an image height of 5.800 mm.

FIG. 37 shows each of the aspheric coefficients of the object-side surface 15 of the first lens element 1 to the image-side surface 96 of the ninth lens element 9 of the eighth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the eighth embodiment is as shown in FIG. 46 and FIG. 47.

FIG. 35A illustrates the longitudinal spherical aberration of the eighth embodiment, in which the imaging point deviation of off-axis rays at different heights is controlled within the range of ±15 microns. In the two field curvature aberration figures of FIG. 35B and FIG. 35C, the focal length variation amounts of three representative wavelengths in the entire field of view are within ±25 microns. The distortion aberration figure of FIG. 35 shows that the distortion aberration of the eighth embodiment is maintained within the range of ±15%. Accordingly, it is explained that the longitudinal spherical aberration, the field curvature aberration in the sagittal direction, and the field curvature aberration in the tangential direction of the eighth embodiment are better than those of the first embodiment, and good imaging quality is provided. In addition, the system length of the eighth embodiment is less than the system length of the first embodiment. The image height of the eighth embodiment is greater than the image height of the first embodiment.

FIG. 38 is a schematic of the optical imaging lens of the ninth embodiment of the invention, and FIG. 39A to FIG. 39D are diagrams of the longitudinal spherical aberration and various aberrations of the optical imaging lens of the ninth embodiment. Referring first to FIG. 38, the ninth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the ninth embodiment, the periphery region 352 of the object-side surface 35 of the third lens element 3 is convex, and the periphery region 362 of the image-side surface 36 thereof is concave. The optical axis region 561 of the image-side surface 56 of the fifth lens element 5 is concave. The optical axis region 861 of the image-side surface 86 of the eighth lens element 8 is convex. It should be mentioned here that, to clearly show the figure, in FIG. 38, the reference numerals of the optical axis region and the periphery region similar to those of the first embodiment are omitted.

The detailed optical data of the optical imaging lens 10 of the ninth embodiment is shown in FIG. 40, and the optical imaging lens 10 of the ninth embodiment has an effective focal length of 6.482 mm, a half field of view (HFOV) of 38.974°, an f-number (Fno) of 1.600, a system length of 8.360 mm, and an image height of 5.800 mm.

FIG. 41 shows each of the aspheric coefficients of the object-side surface 15 of the first lens element 1 to the image-side surface 96 of the ninth lens element 9 of the ninth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the ninth embodiment is as shown in FIG. 46 and FIG. 47.

FIG. 39A illustrates the longitudinal spherical aberration of the ninth embodiment, in which the imaging point deviation of off-axis rays at different heights is controlled within the range of ±14 microns. In the two field curvature aberration figures of FIG. 39B and FIG. 39C, the focal length variation amounts of three representative wavelengths in the entire field of view are within ±20 microns. The distortion aberration figure of FIG. 39 shows that the distortion aberration of the ninth embodiment is maintained within the range of ±12%. Accordingly, it is explained that the longitudinal spherical aberration, the field curvature aberration in the sagittal direction, and the field curvature aberration in the tangential direction of the ninth embodiment are better than those of the first embodiment, and good imaging quality is provided. In addition, the system length of the ninth embodiment is less than the system length of the first embodiment.

The image height of the ninth embodiment is greater than the image height of the first embodiment.

FIG. 42 is a schematic of the optical imaging lens of the tenth embodiment of the invention, and FIG. 43A to FIG. 43D are diagrams of the longitudinal spherical aberration and various aberrations of the optical imaging lens of the tenth embodiment. Referring first to FIG. 42, the tenth embodiment of the optical imaging lens 10 of the invention is substantially similar to the first embodiment, and the difference between the two is as follows: the optical data, the aspheric coefficients, and the parameters of the lens elements 1, 2, 3, 4, 5, 6, 7, 8, and 9 are slightly different. Moreover, in the tenth embodiment, the periphery region 352 of the object-side surface 35 of the third lens element 3 is convex, and the periphery region 362 of the image-side surface 36 thereof is concave. The optical axis region 461 of the image-side surface 46 of the fourth lens element 4 is concave. The optical axis region 561 of the image-side surface 56 of the fifth lens element 5 is concave. The optical axis region 861 of the image-side surface 86 of the eighth lens element 8 is convex. It should be mentioned here that, to clearly show the figure, in FIG. 42, the reference numerals of the optical axis region and the periphery region similar to those of the first embodiment are omitted.

The detailed optical data of the optical imaging lens 10 of the tenth embodiment is shown in FIG. 44, and the optical imaging lens 10 of the tenth embodiment has an effective focal length of 6.448 mm, a half field of view (HFOV) of 38.487°, an f-number (Fno) of 1.600, a system length of 8.214 mm, and an image height of 5.800 mm.

FIG. 45 shows each of the aspheric coefficients of the object-side surface 15 of the first lens element 1 to the image-side surface 96 of the ninth lens element 9 of the tenth embodiment in general formula (1). In the present embodiment, the 2nd aspheric coefficients $a_2$ of the object-side surface 15 of the first lens element 1 to the image-side surface 96 of the ninth lens element 9 are all zero.

Moreover, the relationship between each of the important parameters in the optical imaging lens 10 of the tenth embodiment is as shown in FIG. 46 and FIG. 47.

FIG. 43A illustrates the longitudinal spherical aberration of the tenth embodiment, in which the imaging point deviation of off-axis rays at different heights is controlled within the range of ±14 microns. In the two field curvature aberration figures of FIG. 43B and FIG. 43C, the focal length variation amounts of three representative wavelengths in the entire field of view are within ±20 microns. The distortion aberration figure of FIG. 43 shows that the distortion aberration of the tenth embodiment is maintained within the range of ±14%. Accordingly, it is explained that the longitudinal spherical aberration, the field curvature aberration in the sagittal direction, and the field curvature aberration in the tangential direction of the tenth embodiment are better than those of the first embodiment, and good imaging quality is provided. In addition, the system length of the tenth embodiment is less than the system length of the first embodiment. The image height of the tenth embodiment is greater than the image height of the first embodiment.

Next, refer to FIG. 46 to FIG. 47, which are tables of various optical parameters of the above first embodiment to the tenth embodiment.

According to an embodiment of the invention, by making the optical imaging lens 10 satisfy the condition ImgH/Fno≥2.700 mm, and combined with one of the following combinations, the object of correcting the spherical aberration, aberration, and reducing distortion of the optical system may be facilitated in conjunction with the design of the optical imaging lens 10 with a large image height and a small f-number: (a) the second lens element 2 has negative refracting power, the fifth lens element 5 has negative refracting power, the periphery region 552 of the object-side surface 55 of the fifth lens element 5 is concave, the optical axis region 651 of the object-side surface 65 of the sixth lens element 6 is concave, and the seventh lens element 7 has negative refracting power; (b) the second lens element 2 has negative refracting power, the periphery region 552 of the object-side surface 55 of the fifth lens element 5 is concave, the sixth lens element 6 has positive refracting power, the periphery region 652 of the object-side surface 65 of the sixth lens element 6 is concave, and the optical axis region 751 of the object-side surface 75 of the seventh lens element 7 is convex; (c) the second lens element 2 has negative refracting power, the periphery region 462 of the image-side surface 46 of the fourth lens element 4 is concave, the seventh lens element 7 has negative refracting power, and the optical axis region 961 of the image-side surface 96 of the ninth lens element 9 is concave.

According to some embodiments of the invention, when the optical imaging lens 10 satisfies V2+V4+V5+V6≤200.000, V5+V6+V8≥120.000, |V7−V9β≥0.000, or V3+V5+V7≤105.000, in addition to improving color difference, since different materials have different refractive indexes, combining different materials may make the light rays turn smoothly and converge, thus obtaining better imaging quality. The preferred range is 140.000≤V2+V4+V5+V6≤200.000, 120.000≤V5+V6+V8≤170.000, 30.000≤|V7−V9|≤40.000, or 55.000≤V3+V5+V7≤105.000.

In order to achieve the object of shortening the system length of the optical imaging lens 10, the air gaps between the first lens element 1 to the ninth lens element 9 or the thickness of each of the first lens element 1 to the ninth lens element 9 may be suitably adjusted. In addition, in order to simultaneously consider the difficulty of production and ensure the imaging quality, if the numerical limits of the following conditions are satisfied, a better configuration may be achieved.

$ALT/(T1+G78)≤4.300$, the preferred range is $2.400≤ALT/(T1+G78)≤4.300$;

$(T4+T5+T8)/T3≥4.700$, the preferred range is $4.700≤(T4+T5+T8)/T3≤11.500$;

$EFL/(AAG+T2)≥1.500$, the preferred range is $1.500≤EFL/(AAG+T2)≤2.500$;

$(T6+G67+T7)/G78≤4.200$, the preferred range is $2.200≤(T6+G67+T7)/G78≤4.200$;

$(G89+T9)/(G67+G78)≥2.000$, the preferred range is $2.000≤(G89+T9)/(G67+G78)≤3.500$;

$(T1+G23+G34)/T2≥4.200$, the preferred range is $4.200≤(T1+G23+G34)/T2≤8.600$;

$TTL/(T1+T2+T3)≤6.400$, the preferred range is $5.000≤TTL/(T1+T2+T3)≤6.400$;

$T8/(T3+G34)≥1.000$, the preferred range is $1.000≤T8/(T3+G34)≤3.600$;

$BFL/(T7+G78)≤2.000$, the preferred range is $0.600≤BFL/(T7+G78)≤2.000$;

$AAG/(G45+G56)≤6.200$, the preferred range is $3.500≤AAG/(G45+G56)≤6.200$;

$(G12+G56+G78)/T9 \leq 2.300$, the preferred range is $0.600 \leq (G12+G56+G78)/T9 \leq 2.300$;

$TL/ImgH \leq 2.000$, the preferred range is $1.000 \leq TL/ImgH \leq 2.000$;

$(T3+T4)/T7 \leq 2.300$, the preferred range is $1.000 \leq (T3+T4)/T7 \leq 2.300$;

$AAG/(G23+G34+G45) \geq 2.900$, the preferred range is $2.900 \leq AAG/(G23+G34+G45) \leq 4.600$;

$(T1+T2+T3)/T9 \geq 2.000$, the preferred range is $2.000 \leq (T1+T2+T3)/T9 \leq 6.100$.

In view of the unpredictability of optical system design, under the configuration of the invention, by meeting the above conditions, the optical imaging lens of an embodiment of the invention may have shorter system length, increased image height, reduced f-number, and have good imaging quality.

The above-listed exemplary limiting relational expressions may also be combined arbitrarily in varying quantities and applied to the embodiments of the invention, and are not limited thereto. When the invention is implemented, in addition to the above relationships, additional detailed structures such as a concave-convex curved surface arrangement may also be designed for a single lens element or a wide range of lens elements to strengthen the control of system performance and/or resolution. It should be noted that these details need to be optionally combined and used in other embodiments of the invention without conflict.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or AB or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An optical imaging lens comprising a first lens element, a second lens element, a third lens element, a fourth lens element, a fifth lens element, a sixth lens element, a seventh lens element, an eighth lens element, and a ninth lens element sequentially arranged along an optical axis from an object side to an image side, wherein each of the first lens element to the ninth lens element comprises an object-side surface facing the object side and allowing imaging rays to pass through and an image-side surface facing the image side and allowing the imaging rays to pass through;

the second lens element has negative refracting power;
the fifth lens element has negative refracting power and a periphery region of the object-side surface of the fifth lens element is concave;
an optical axis region of the object-side surface of the sixth lens element is concave;
the seventh lens element has negative refracting power;
wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

2. The optical imaging lens of claim 1, wherein the optical imaging lens further satisfies: ALT/(T1+G78)≤4.300, wherein ALT is a sum of nine thicknesses of the first lens element to the ninth lens element on the optical axis, T1 is a thickness of the first lens element on the optical axis, and G78 is an air gap between the seventh lens element and the eighth lens element on the optical axis.

3. The optical imaging lens of claim 1, wherein the optical imaging lens further satisfies: V2+V4+V5+V6≤200.000, wherein V2, V4, V5, and V6 are Abbe numbers of the second lens element, the fourth lens element, the fifth lens element, and the sixth lens element, respectively.

4. The optical imaging lens of claim 1, wherein the optical imaging lens further satisfies: (T4+T5+T8)/T3≥4.700, wherein T4, T5, T8, and T3 are thicknesses of the fourth lens element, the fifth lens element, the eighth lens element, and the third lens element on the optical axis, respectively.

5. The optical imaging lens of claim 1, wherein the optical imaging lens further satisfies: EFL/(AAG+T2)≥1.500, wherein EFL is an effective focal length of the optical imaging lens, AAG is a sum of eight air gaps of the first lens element to the ninth lens element on the optical axis, and T2 is a thickness of the second lens element on the optical axis.

6. The optical imaging lens of claim 1, wherein the optical imaging lens further satisfies: V5+V6+V8≥120.000, wherein V5, V6, and V8 are Abbe numbers of the fifth lens element, the sixth lens element, and the eighth lens element, respectively.

7. The optical imaging lens of claim 1, wherein the optical imaging lens further satisfies: (T6+G67+T7)/G78≤4.200, wherein T6 and T7 are thicknesses of the sixth lens element and the seventh lens element on the optical axis, respectively, G67 is an air gap between the sixth lens element and the seventh lens element on the optical axis, and G78 is an air gap between the seventh lens element and the eighth lens element on the optical axis.

8. An optical imaging lens comprising a first lens element, a second lens element, a third lens element, a fourth lens element, a fifth lens element, a sixth lens element, a seventh lens element, an eighth lens element, and a ninth lens element sequentially arranged along an optical axis from an object side to an image side, wherein each of the first lens element to the ninth lens element comprises an object-side surface facing the object side and allowing imaging rays to pass through and an image-side surface facing the image side and allowing the imaging rays to pass through;
the second lens element has negative refracting power;
a periphery region of the object-side surface of the fifth lens element is concave;
the sixth lens element has positive refracting power and a periphery region of the object-side surface of the sixth lens element is concave;
an optical axis region of the object-side surface of the seventh lens element is convex,
wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

9. The optical imaging lens of claim 8, wherein the optical imaging lens further satisfies: (G89+T9)/(G67+G78)≥2.000, wherein T9 is a thickness of the ninth lens element on the optical axis, G89 is an air gap between the eighth lens element and the ninth lens element on the optical axis, G67 is an air gap between the sixth lens element and the seventh lens element on the optical axis, and G78 is an air gap between the seventh lens element and the eighth lens element on the optical axis.

10. The optical imaging lens of claim 8, wherein the optical imaging lens further satisfies: (T1+G23+G34)/T2≥4.200, wherein T1 and T2 are thicknesses of the first lens element and the second lens element on the optical axis, respectively, G23 is an air gap between the second lens element and the third lens element on the optical axis, and G34 is an air gap between the third lens element and the fourth lens element on the optical axis.

11. The optical imaging lens of claim 8, wherein the optical imaging lens further satisfies: TTL/(T1+T2+T3) ≤6.400, wherein TTL is a distance from the object-side surface of the first lens element to an image plane on the optical axis, and T1, T2, and T3 are thicknesses of the first lens element, the second lens element, and the third lens element on the optical axis, respectively.

12. The optical imaging lens of claim 8, wherein the optical imaging lens further satisfies: T8/(T3+G34)≥1.000, wherein T8 and T3 are thicknesses of the eighth lens element and the third lens element on the optical axis, respectively, and G34 is an air gap between the third lens element and the fourth lens element on the optical axis.

13. The optical imaging lens of claim 8, wherein the optical imaging lens further satisfies: BFL/(T7+G78)≤2.000, wherein BFL is a distance from the image-side surface of the ninth lens element to an image plane on the optical axis, T7 is a thickness of the seventh lens element on the optical axis, and G78 is an air gap between the seventh lens element and the eighth lens element on the optical axis.

14. The optical imaging lens of claim 8, wherein the optical imaging lens further satisfies: AAG/(G45+G56) ≤6.200, wherein AAG is a sum of eight air gaps of the first lens element to the ninth lens element on the optical axis, G45 is an air gap between the fourth lens element and the fifth lens element on the optical axis, and G56 is an air gap between the fifth lens element and the sixth lens element on the optical axis.

15. An optical imaging lens comprising a first lens element, a second lens element, a third lens element, a fourth lens element, a fifth lens element, a sixth lens element, a seventh lens element, an eighth lens element, and a ninth lens element sequentially arranged along an optical axis from an object side to an image side, wherein each of the first lens element to the ninth lens element comprises an object-side surface facing the object side and allowing imaging rays to pass through and an image-side surface facing the image side and allowing the imaging rays to pass through;
the second lens element has negative refracting power;
a periphery region of the image-side surface of the fourth lens element is concave;
the seventh lens element has negative refracting power, an optical axis region of the image-side surface of the seventh lens element is concave;
an optical axis region of the image-side surface of the ninth lens element is concave,
wherein lens elements of the optical imaging lens are only the nine lens elements described above to meet a condition ImgH/Fno≥2.700 mm, wherein ImgH is an image height of the optical imaging lens, and Fno is an f-number of the optical imaging lens.

16. The optical imaging lens of claim 15, wherein the optical imaging lens further satisfies: (G12+G56+G78)/T9≤2.300, wherein G12 is an air gap between the first lens element and the second lens element on the optical axis, G56 is an air gap between the fifth lens element and the sixth lens element on the optical axis, G78 is an air gap between the seventh lens element and the eighth lens element on the optical axis, and T9 is a thickness of the ninth lens element on the optical axis.

17. The optical imaging lens of claim 15, wherein the optical imaging lens further satisfies: TL/ImgH≤2.000, wherein TL is a distance from the object-side surface of the first lens element to the image-side surface of the ninth lens element on the optical axis.

18. The optical imaging lens of claim 15, wherein the optical imaging lens further satisfies: |V7−V9|≥30.000, wherein V7 and V9 are Abbe numbers of the seventh lens element and the ninth lens element, respectively.

19. The optical imaging lens of claim 15, wherein the optical imaging lens further satisfies: (T3+T4)/T7≤2.300, wherein T3, T4, and T7 are thicknesses of the third lens element, the fourth lens element, and the seventh lens element on the optical axis, respectively.

20. The optical imaging lens of claim 15, wherein the optical imaging lens further satisfies: AAG/(G23+G34+G45)≥2.900, wherein AAG is a sum of eight air gaps of the first lens element to the ninth lens element on the optical axis, G23 is an air gap between the second lens element and the third lens element on the optical axis, G34 is an air gap between the third lens element and the fourth lens element on the optical axis, and G45 is an air gap between the fourth lens element and the fifth lens element on the optical axis.

* * * * *